United States Patent
Tsai et al.

(10) Patent No.: US 11,469,804 B1
(45) Date of Patent: Oct. 11, 2022

(54) SECTORIZED ANALOG BEAM SEARCH SYSTEM

(71) Applicant: Amazon Technologies, Inc., Seattle, WA (US)

(72) Inventors: Kun Ting Tsai, Fremont, CA (US); Manvendra Sharma, San Jose, CA (US); Tzung-I Lee, San Jose, CA (US); Cheol Su Kim, San Jose, CA (US); Sarang Wagholikar, Sunnyvale, CA (US); Omar Fawazhashim Zakaria, Saratoga, CA (US); Nathan Labadie, Hollister, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/464,613

(22) Filed: Sep. 1, 2021

(51) Int. Cl.
*H04B 7/06* (2006.01)
*H04B 17/318* (2015.01)

(52) U.S. Cl.
CPC ......... *H04B 7/0617* (2013.01); *H04B 7/0695* (2013.01); *H04B 17/318* (2015.01)

(58) Field of Classification Search
CPC ... H04B 7/0617; H04B 7/0695; H04B 17/318

USPC ........................................................ 375/267
See application file for complete search history.

(56) References Cited

U.S. PATENT DOCUMENTS

| 9,215,622 B1* | 12/2015 | Kinamon | H01Q 21/24 |
| 2017/0257780 A1* | 9/2017 | Ryoo | H04B 7/0617 |

* cited by examiner

*Primary Examiner* — Fitwi Y Hailegiorgis
(74) *Attorney, Agent, or Firm* — Lowenstein Sandler LLP

(57) ABSTRACT

Technologies directed to sectorized analog beam searching are described. One method includes a first wireless device receiving a first destination address of a second wireless device, a first angle value corresponding to a first direction, and a second angle value corresponding to a second direction. The first wireless device generates a first signal beam transmitted in the first direction and spanning a first geographic region and receives an RSSI value corresponding to the first signal beam. The first wireless generates a second signal beam transmitted in the second direction and spanning a second geographic region and receives a second RSSI value corresponding to the second signal beam. The first wireless device determines that the first RSSI value is greater than the second RSSI value. The first wireless device determines, using a third signal beam a third angle value corresponding to a third direction located within the first geographic region.

20 Claims, 18 Drawing Sheets

SECTORIZED ANALOG BEAM SEARCH SYSTEM

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
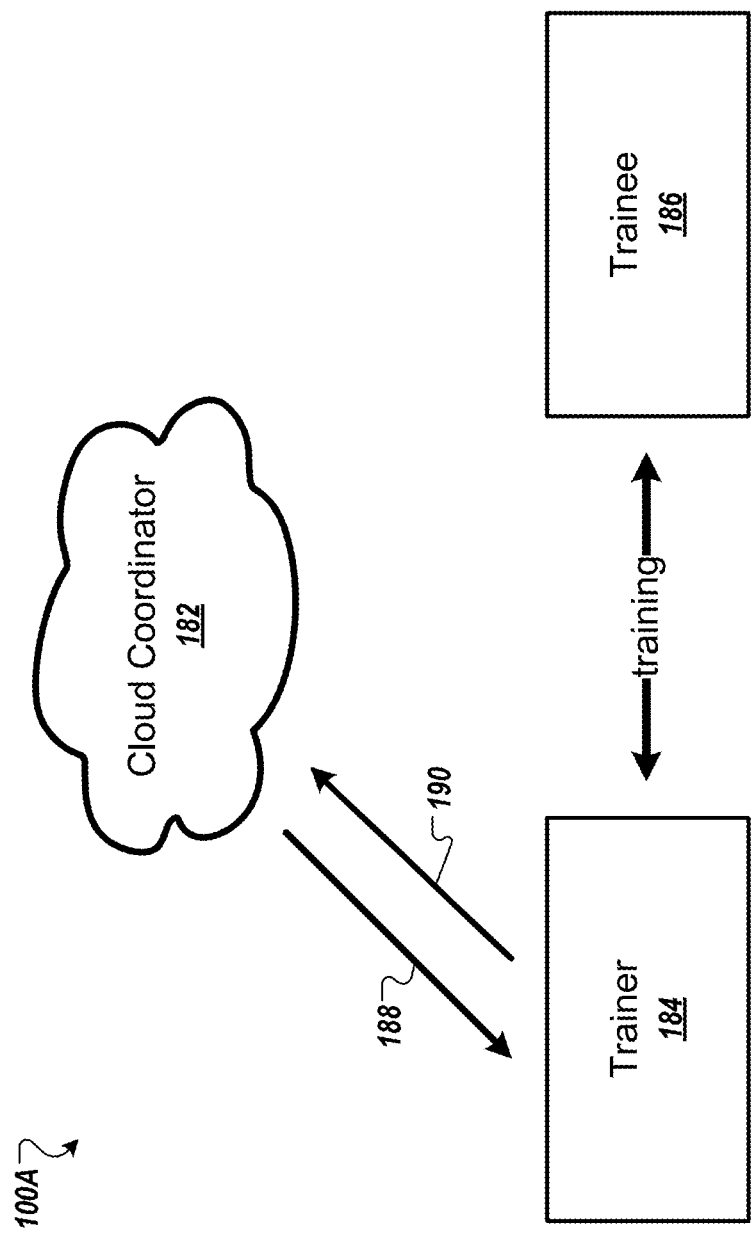
FIG. 1A is a network diagram of a cloud coordinator service, a trainer device, and a trainee device of a sectorized analog beam search system, according to one embodiment.

Technologies directed to sectorized analog beam searching are described. Beamforming is commonly used in IEEE 802.11 wireless transmissions to improve signal-to-noise ratio (SNR). Two types of beamforming technologies which are commonly used today are digital beamforming and analog beamforming. Digital beamforming uses special sounding packets to derive the accurate phase between the transmitter and the receiver. The disadvantages of digital beamforming are that digital beamforming only improves the SNR of high modulation and coding scheme (MCS) data packets; thus, digital beamforming does not help devices that are using low data rates and does not improve the range of management, control, and action frames. MCS is a way to organize data surrounding how transmitters in wireless local area networks (WLANs) prepare data to be sent using various technologies. When any device, either AP or client wants to transmit, it will choose one of multiple MCSs (identified as a MCS index) and attempt with that unique set of technical features. If it is successful and the transmitter receives an acknowledgement (ACK), then the device will most likely continue to use that set of features as categorized by an MCS index. If it repeatedly fails, then each individual firmware logic will make a different choice of paths through the set of MCS indexes in order to find a feature set that is effective.

Analog beamforming overcomes these limitations of digital beamforming; however, conventional analog beamformers could only do point-to-point communication since the phase and amplitude of the beamformer are statically set to generate only one single beam. Using conventional analog beamformers, antenna alignment between two devices can be difficult and time consuming. In addition to antenna alignment being difficult and time consuming, conventional a conventional high-performance beamforming antenna for sub-7 GHz operation is very expensive. Also, long distance point-to-point (PtP) communication is challenging because of Equivalent Isotropically Radiated Power (EIRP) limits, cable loss, and cost and installation of high gain antenna. Also, a fan-beam antenna radiation pattern of a conventional high-performance beamforming antenna generates and receives interference more so than other radiation patterns, such as a pencil-beam radiation pattern. Also, in some cases, long cables are needed between the conventional high-performance beamforming antennas and the radio and the long cables can degrade wireless performance.

Analog beamforming often involves a protocol exchange between a beamformer and a beamformee. For example, to optimize or otherwise improve data transfer between analog beamforming devices a beamforming configuration of a beam generation device and a beam reception device can be coordinated. The process of identifying an optimal (e.g., meeting a threshold criterion speed and/or signal quality) communication configuration often involves performing multiple beamforming configuration sweeps by both the beam generation device and the beam receiving device. The search space of a beam sweeping process may become cumbersome as the number of beamforming configuration parameters increases.

Aspects of the present disclosure provide a lower-cost antenna beamformer architecture that enables automatic beam alignment and scanning. Aspects of the present disclosure can provide a scalable architecture in a single stockkeeping unit (SKU) for short-range communication links (e.g., less than 200 meters (m), for mid-range communication links (e.g., approximately 500 m), and for long-range communication links (e.g., greater than 1 km). Aspects of the present disclosure can reduce interference level by using a steerable pencil beam that can obtain the same or similar coverage as the fan-beam pattern. Aspects of the present disclosure can enable long-distance communication with a compact size antenna beamformer in a frequency range of approximately 5-7 GHz, for example. Aspects of the present disclosure can utilize a neighbor lookup database and a cloud coordinate for dynamic beam searching as described below.

Technologies directed to sectorized analog beam searching are described. One method includes receiving, by a first wireless device, a first destination address of a second wireless device, a first angle, and a second angle. The first wireless device generates a first signal beam transmitted in a first propagation direction associated with the first angle and spanning a first geographic region. The first wireless device receives a RSSI value corresponding to the first signal beam. The first wireless generates a second signal beam transmitted in a second propagation associated with the second angle and spanning a second geographic region. The first wireless devices receives a second RSSI value corresponding to the second signal beam. The first wireless device determines that the first RSSI is greater than the second RSSI value. The wireless device determines a third angle by sweeping a third signal beam through a first set of angles within the first geographic region.

FIG. 1A is a network diagram of a cloud coordinator service 182, a trainer device 184, and a trainee device 186 of a coordinated sectorized analog beam search system 100A, according to one embodiment. The cloud coordinator service 182 can be implemented as processing logic comprising hardware, software, firmware, or any combination thereof at one or more servers of a cloud computing system. The cloud coordinator service 182 can initiate and coordinate a sectorized beam searching training between the trainer device 184 and the trainee device 186. The cloud coordinator 182 initiates a first training procedure by propagating a first data packet 188 including a trainer sector table and a device list having one or more identified trainees to the trainer device 184. The cloud coordinator service 182 can collect information for the neighbor SNR matrix table (e.g., 1402) by first collecting a scan list from each of the devices (e.g., trainer device 184, trainee device 186, and other beam searching participating devices (sometime referred to as nodes). The cloud coordinator service 182 can also collect additional information, such as global positioning system (GPS) coordinates of the node, predefined node placements of nodes, or the like. This information can be used to identify neighbors for each node. The cloud coordinator service 182 may leverage neighbors of each node to populate a trainee list for the trainer device 184. In some embodiments, the cloud coordinator service 182 is communicatively coupled to trainer device 184 and the trainer device 186 is communicatively coupled to the trainee device 186. In some embodiments, the cloud coordinator service 182 is communicatively coupled to the trainee device 186.

As will be discussed further in later embodiments, the trainer sector table consists of a sector identification (ID) and an associated beamforming configuration. The trainer device 184 and/or trainee device 186 may include one or more of the wireless device 100BB, 400 of FIGS. 1B and 4, respectively and one or more communication features of beamformer IC 200 and RF module 300 of FIGS. 3 and 4, respectively. The trainee list comprises trainee IDs and Sector ID list. A trainee ID may include a media access control (MAC) address. The Sector ID list may include a list of sectors to scan and listen for an associated trainee device.

A beamforming configuration may include a phase shifter configuration (e.g., a phase shifter angle value), an attenuator configuration (e.g., an attenuator value), and an amplifier configuration (e.g., an amplifier value). A sector ID identifies one or more sector. A sector is associated with a geographic region, as is discussed further in association with FIG. 8. In some embodiments, a sector includes a subset of possible beamforming configurations. A sector may include one or more of a selection of phase shifter values, a selection of attenuator values, and/or a selection of amplitude values. For example, a first sector may include a first selection of phase shifter angle values such as between phase shifter angle values between x Degrees and y Degrees. In another example, a second sector may include a first selection of attenuation values between x decibels (dB) and y dB. The trainee list may be leveraged to notify the trainer device 184 to participate is a training procedure with the trainer device 184. In some embodiments, the one or more sectors may be associated with geographic regions (e.g., regions proximate the trainer device 184). In some embodiments, the geographic regions may be mutually exclusive (e.g., non-overlapping). In some embodiments, the geographic regions may be of the same size or of different sizes.

The trainer device 184 may receive the first data and carry out one more training procedures as detailed in FIGS. 9-13 and corresponding discussion. The training procedure may be performed between the trainer device 184 and multiple trainee 186 across multiple beam configuration sectors. The trainer device 184 may determine one or more training results and return training result data 184 to the cloud coordinator 186 during and/or at the conclusion of the training procedure.

The training results may include a swift training table. The swift training table may include a trainee ID, a sector ID, and an associated received signal strength indicator (RSSI) associated with a communication configuration (e.g., a beamforming configuration of the trainer device 184 and the beamforming configuration of the trainee device 186) while the trainer is operating with a beamforming configuration defined with the associated sector identified by the sector ID. In some embodiments, the training result data may include one or more data elements associated with neighbor SNR matrix table 1402, optimal selection table 1404 and multicast group table 1406. Specifically, the training result data may include first beamforming configuration data (e.g., pencil-beam configuration data) corresponding to the trainer device 184 and second beamforming configuration data (e.g., pencil-beam configuration data) corresponding to with the trainee device 186. The first and second beamforming configuration data may be an optimal beamforming configuration combination in that the combination may result in signals communicated between the trainer device 184 and the trainee device 186 with a relatively greater signal quality (e.g., using a signal quality metric such as an RSSI value or an SNR value) that other beamforming configuration combinations. In some embodiments, the optimal beamforming configuration combination results in signals communicated between the trainer device 184 and the trainee device 186 being received with a signal quality metric value above a threshold condition (e.g., a minimum signal quality threshold).

In some embodiments, the cloud coordinator service can send a first data packet 188 including a training command to the trainer device 190 and receive training result data 190 to populate one or more of neighbor SNR matrix table 1402, optimal selection 1404 and/or multicast group table 1406. The cloud coordinator service 182 can continue the training procedure for other combinations of trainer devices and trainee devices (e.g., to further populate the neighbor SNR matrix table 1402).

In one embodiment, the cloud coordinator service 182 sends a Training Start Period in universal time coordinated (UTC) time, a Training Period, and Configurations to be trained to each trainer device 184 and/or trainee device 186 in the network to perform neighbor discovery training to populate the neighbor SNR matrix table 1402. Once the neighbor SNR matrix table 1402 is populated at the cloud coordinator service 182, the neighbor information is then passed down to each node (e.g., trainer and trainee devices) to create the neighbor SNR matrix table or a copy of the neighbor SNR matrix table is sent to each node. The cloud coordinator service 182 can derive the optimal selection table based on the training result data 190.

In another embodiment, the cloud coordinator service 182 can populate the multicast group table, and the cloud coordinator service 182 creates training neighbor permutations (e.g., trainer/trainee groupings). For example, if Node A has two neighbors Node B and C. The multicast group table would include four groups, ABC, AB, AC, and BC. The cloud coordinator service 182 initiates the beamforming configuration training for all groups by assigning one node of the group as trainer and the other nodes of the group as trainee in the multicast group table. The receiver of the multicast frames from each of the training session propagates the training results to the cloud coordinator service 182.

In some embodiments, a data packet housing beamforming configuration can include the following fields: a source MAC field, a destination MAC field, a payload field, and a beamformer configuration field. The source MAC field can include an identifier that identifies node A, such as the MAC of the device that is transmitting the data packet. The destination MAC field can include an identifier that identifies the node B, such as the MAC of the device that is to receive the data packet. The payload field can include a data payload being sent. The data payload can be training data or dummy data. The beamformer configuration field can include the beamformer configuration data being used to transmit the data packet.

An exemplary training interaction between the cloud coordinator 182, the trainer 184, and the trainer 186 may goes as follows. The cloud coordinator sends first data 188 to the trainer device 184, the first data 188 may include a first destination address of the trainee device 186, a first angle, and a second angle. The trainer device 184 sends second data to the trainer device 186 by generating a first broad-angle beam transmitted in the first angle and spanning a first geographic region (e.g., a first sector). The trainee device 186 sends, to the trainer device 184, a first received signal strength indicator (RSSI) value associated with the trainee device 186 receiving the second data.

The trainee device 184 sends third data to the trainee device 186 by generating a second broad-angle beam transmitted along the second angle a spanning the second geographic region (e.g., second sector). The trainee device 186 sends, to the trainer device 186, a second RSSI value associated with the trainee device 186 receiving the third data. The trainer device 184 may determine that the first RSSI value is greater than the second RSSI value;

The trainer device 184 exchanges (e.g. a first beamformer circuit exchanging the data) a first series of data packets (e.g., internet control message protocol (IMCP) packets) with the trainee device 186 by generating the first broad-angle beam directed along the first angle and the sweeping a first beamforming direction of the trainee device 186 through a first set of angles. The trainer device 184 determines a third angle and a third RSSI value associated with the trainee device 186 exchanging (e.g. a second beamformer circuit exchanging the data) one or more of the first series of data packets at the third angle The trainee device exchanges a second series of data packets with the first wireless device by generating a first pencil-beam directed along the third angle and the first beamformer circuit sweeping a second beamforming direction of the first beamformer circuit direction through a second set of angles within the first geographic region. The trainer device 184 determines a fourth angle and a fourth RSSI value associated with the first trainer device 184 exchanging one or more of the second series of data packets at the fourth angle The trainer device 184 may send fourth data 190 to the controller device, the fourth data indicating the third angle, the fourth angle, the third RSSI value, and the fourth RSSI value.

Figure 1B:
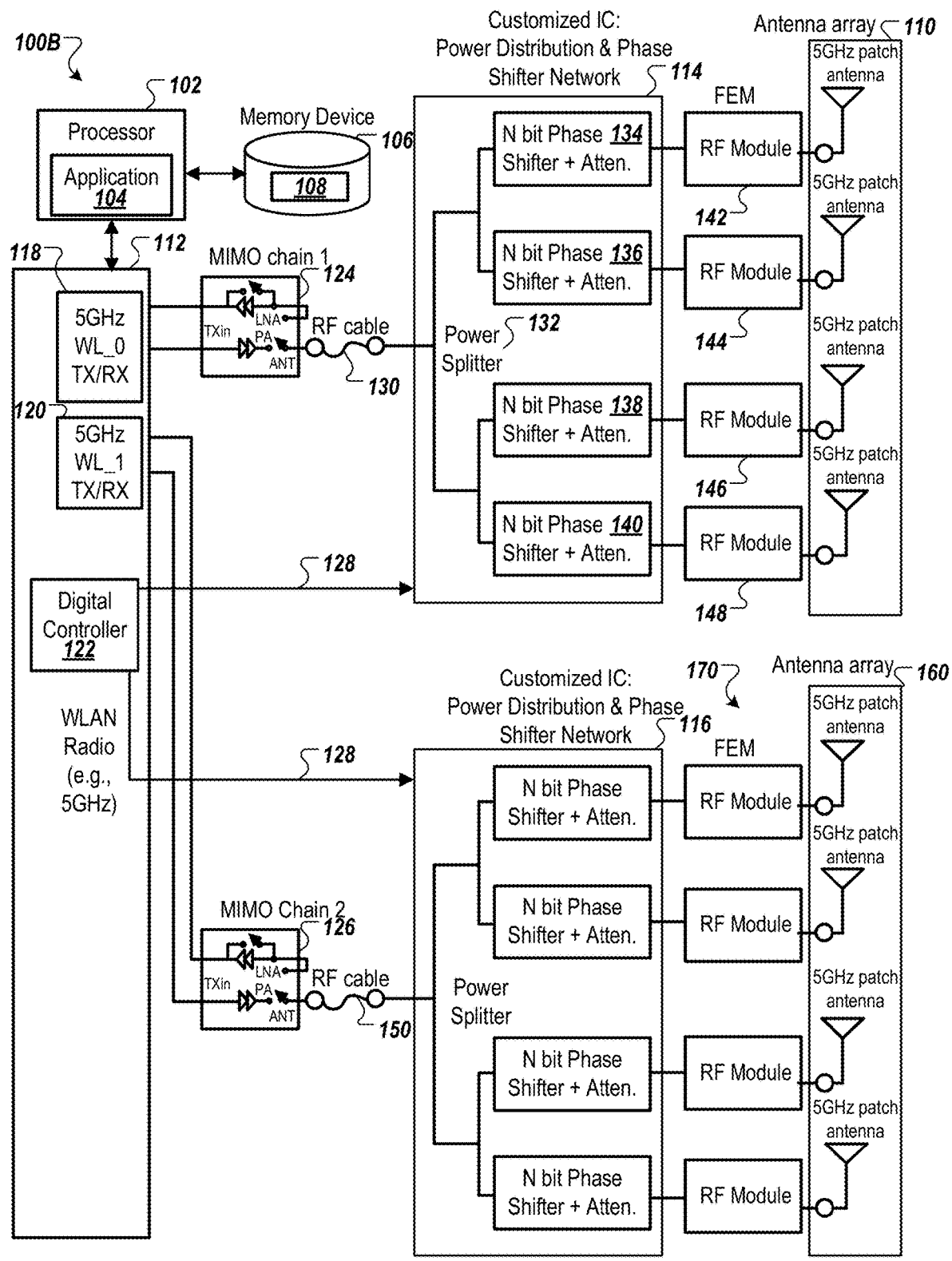
FIG. 1B is a block diagram of a scalable architecture of a wireless device for coordinated sectorized analog beam searching according to one embodiment.

FIG. 1B is a block diagram of a scalable architecture of a wireless device 100BB for coordinated sectorized analog beam searching, according to one embodiment. The wireless device 100B is also referred to herein as "dynamic analog beamformer" or "analog beamformer." The wireless device 100B includes a processor 102 that executes an application 104, a memory device 106 that stores storing beamformer configuration data 108, a first antenna array 110 of elements, a wireless local area network (WLAN) radio 112, and first beamformer circuit 114, and a second beamformer circuit 116. The WLAN radio 112 includes first transceiver circuitry 118 and second transceiver circuitry 120, and a digital controller 122. A first multiple-input, multiple-output (MIMO) chain 124 is coupled to the first transceiver circuitry 118 and a second MIMO chain 126 is coupled to the second transceiver circuitry 120. The first MIMO chain 124 can include a low noise amplifier (LNA) and a power amplifier (PA). In some cases, the first MIMO chain 124 is considered to be a front-end module (FEM). Instead of coupling the FEM directly to the antenna element, the FEM is coupled to the first antenna element via the first RF cable 130, the first beamformer circuit 114, and an optional RF module 142. The digital controller 122 outputs a phase control signal 128 via a digital control interface to the first beamformer circuit 114. The first beamformer circuit 114 is coupled to the digital controller 122, the first antenna array 110, and the first MIMO chain 124 via a first RF cable 130. The first beamformer circuit 114 includes a first power splitter 132 that is coupled to the first RF cable 130. The first beamformer circuit 114 can include a set of attenuators and a set of phase shifters (two or more phase shifters). Alternatively, the first beamformer circuit 114 can include only a set of phase shifters. The number of attenuators and phase shifters in the set corresponds to a number of channels, referred to as M. As illustrated in FIG. 1B, the first beamformer circuit 114 includes four attenuators and four phase shifters, but can be expanded to M, where M is a positive integer representing a number of channels. The first power splitter 132 can be a 1 to M power splitter coupled to M phase shifters and optionally coupled to M attenuators. The M attenuators can be used to reduce side lobes in the pencil-beam radiation pattern. The digital controller 122 can control the M phase shifter and the M attenuators to provide up to $2^{4(M)*N}$ different phase combinations via the digital control interface, where N is the number of bit phase control of the phase shifters. The phase shifters are also referred to as N-bit phase shifters. The first beamformer circuit 114 and the second beamformer circuit 116 can be separate integrated circuits or a single integrated circuit. The beamformer circuit can also be referred to as a beamformer chip or beamformer chipset.

In the depicted embodiment, the first beamformer circuit 114 includes a first attenuator and phase shifter 134, a second attenuator and phase shifter 136, a third attenuator and phase shifter 138, and a fourth attenuator and phase shifter 140, each coupled to the first power splitter 132. The first attenuator and phase shifter 134 is coupled to a first element of the first antenna array 110, the second attenuator and phase shifter 136 is coupled to a second element of the first antenna array 110, the third attenuator and phase shifter 138 is coupled to a third element of the first antenna array 110, and the fourth attenuator and phase shifter 140 is coupled to a fourth element of the first antenna array 110.

In some embodiments, during operation, the digital controller receives a first data packet from the application 104. The data packet may include a destination address of a second wireless devices, first beamforming configuration data, and a first command initiating a first training procedure associated with a second wireless device. The first beamforming configuration data may include a phase shifter angle value, an attenuation value, and an amplifier value.

The digital controller sends, to the first beamformer circuit 114, the first selection of phase shifter angle values and the first selection of attenuation values. The first beamformer circuit 114 causes the first set of phase shifters (e.g., the first phase shifter 134, the second phase shifter 136, the third phase shifter 138, and the fourth phase shifter 140) to steer the wide angle radiation pattern of electromagnetic energy, radiated by the first antenna array 110, at the first phase shifter angle value with a first beamwidth spanning a first geographic region. The first beamwidth may be associated with a wide-angle beam radiation pattern. The first geographic region may be associated with a first sector, as will be described further in later embodiments. In general, the antenna boresight is the axis of maximum gain (maximum radiated power) of a steerable array antenna. The antenna boresight is the axis of symmetry in the radiation pattern, such as the main lobe. The phase shifter angle value can identify a boresight axis and a beam width about which a primary lobe of the radiation pattern is centered. In phase array antennas, the radiation pattern can be narrow (e.g., a pencil-beam) or broad (e.g., broad-angle beam). The radiation pattern can be electronically steered, changing the angle of the boresight by shifting the relative phase of the radio waves emitted by different antenna elements (two or more antenna elements, collectively). It is possible to radiate beams in multiple directions, i.e., multiple boresights (e.g., such as to generate a broad angle beam for using in sectorization). The first beamformer circuit 114 sets the first set of attenuators (e.g., the first attenuator, the second attenuator, the third attenuator, and the fourth attenuator) to a first attenuation value associated with a beam searching sector (e.g., sectors 806A-C) as described further in association with FIG. 8.

The first transceiver circuitry 118 sends a second data packet to the second wireless device via the first antenna array using the first beamforming configuration data. The second data packet includes the first destination address. The digital controller 122 receives from the second wireless device, a third data packet. The third data packet includes an association request corresponding to the second data packet. The first transceiver circuitry 118 sends to the second wireless device, a first command causing the second wireless device to sweep across a first set of beamforming configurations. In some embodiments, the first set of beamforming configurations are associated with one or more narrow beam (e.g., pencil-beam) radiation patterns. As is discussed further in later embodiments, the second wireless device identifies a beamforming configuration associated with relatively high (e.g., meeting a threshold value, a local optimization value) signal quality metric value (e.g., an RSSI value or an SNR value). The digital controller receives from the second wireless device, a fourth data packet. The fourth data packet includes beamforming configuration data having a first phase shifter angle value and a first attenuation value for a first pencil-beam radiation pattern.

The digital controller sends, to the first beamformer circuit 114, third beamforming configuration data including a second phase shifter angle values of the first selection of phase shifter angle values and a second attenuation value of the first selection of attenuation values for a second narrow-beam (e.g., pencil-beam) radiation pattern of electromagnetic energy. The first beamformer circuit 114 because the first set of phase shifter to steer the second pencil-beam radiation pattern, radiated by the first antenna array, at the second phase shifter angle value. The first beamformer circuit 114 set the first set of attenuators to the second attenuation value.

The first transceiver circuitry sends to the second wireless device using the third beamforming configuration data, a second command requesting initiation of a third training procedure. The third training procedure comprising locking a beamforming configuration of the second wireless device while sweeping through multiple narrow-beamforming configurations by the beamformer circuit 116. The digital controller receives from the second wireless device, a fifth data packet. The fifth data packet includes a first signal quality metric value corresponding to the second wireless device receiving the second command. The digital controller sends to the application, a sixth data packet, the sixth data packet includes the first beamforming configuration data, the second beamforming configuration data, and the third beamforming configuration data.

In some embodiments, during operation, the digital controller 122 receives a data packet from the application 104. The data packet includes a destination address of a second wireless device. The digital controller 122 retrieves, from the memory device 106, the beamformer configuration data 108 that is associated with the destination address. In some cases, the memory device 106 can store the entire neighbor lookup database described herein. Alternatively, the memory device 106 can store the optimal selection table. Alternatively, the memory device 106 can store portions of the neighbor lookup database. The digital controller 122 sends, to the first beamformer circuit 114 via the digital control interface, a phase shifter angle value for a pencil-beam radiation pattern and a first attenuation value from the beamformer configuration data. The first beamformer circuit 114 causes the first phase shifter, the second phase shifter, the third phase shifter, and the fourth phase shifter to steer the pencil-beam radiation pattern of electromagnetic energy, radiated by the first antenna array, at the phase shifter angle value. In general, the antenna boresight is the axis of maximum gain (maximum radiated power) of a steerable antennas. The antenna boresight is the axis of symmetry in the radiation pattern, such as the main lobe. The phase shifter angle value can identify the boresight axis about which the main lobe of the radiation pattern is centered. In phased array antennas, the radiation pattern can be electronically steered, changing the angle of the boresight by shifting the relative phase of the radio waves emitted by different antenna elements. It is possible to radiate beams in multiple directions, i.e., multiple boresights. The first beamformer circuit sets the first attenuator, the second attenuator, the third attenuator, and the fourth attenuator to the first attenuation value. The first transceiver circuitry 118 sends the data packet to the second wireless device via the first antenna array 110.

In a further embodiment, the first beamformer circuit 114 includes or the wireless device includes 100B a first RF module 142 coupled between the first phase shifter and the first element, a second RF module 144 coupled between the second phase shifter and the second element, a third RF module 146 coupled between the third phase shifter and the third element, and a fourth RF module 148 coupled between the fourth phase shifter and the fourth element. The digital controller 122 sends, to the RF modules via the digital control interface, a first amplifier classifier from the beamformer configuration data 108. An amplifier classifier can specify whether no amplifier is used, whether a LNA is used for an RX mode only, or whether a LNA is used for an RX mode and a power amplifier is used for a TX mode. That is, the amplifier classifier can specify use of no amplifier, a LNA, or a LNA and PA. The amplifier classifier can be a value, such as 0 for when no amplifier is used, 1 when LNA only is used, and 2 when LNA and power amplifier are used, a description (e.g., no amplification, receive amplification, or transmit/receive amplification), an identifier, or the like. Each amplifier classifier can correspond to an amplifier configuration level or setting. The digital controller 122 sets the first RF module 142, the second RF module 144, the third RF module 146, and the fourth RF module 148 to the first amplifier value. In another embodiment, the RF modules can be part of the first beamformer circuit 114. In other embodiments, a front-end module (FEM) can be used before the MIMO chain and after the beamformer circuit, such as described below with respect to FIG. 4.

In the depicted embodiment, the second transceiver circuitry 120 is coupled to the second MIMO chain 126 and the second MIMO chain 126 is coupled to the second beamformer circuit 116 via a second RF cable 150. The second beamformer circuit 116 is coupled to a second antenna array 160 via a set of RF modules 170. The second beamformer circuit 116 includes a second power splitter coupled to the second RF cable 150 and four channels, each channel with an attenuator and a phase shifter, similar to those described above with respect to the first beamformer circuit 114.

During operation of the wireless device with the two antenna arrays, the digital controller 122 sends, to the second beamformer circuit 116 via the digital control interface, the phase control signal 128 with the phase shifter angle value and the first attenuation value from the beamformer configuration data. The second beamformer circuit 116 causes a fifth phase shifter, a sixth phase shifter, a seventh phase shifter, and an eighth phase shifter to steer the pencil-beam radiation pattern at the phase shifter angle value. The second beamformer circuit 116 sets a fifth attenuator, a sixth attenuator, a seventh attenuator, and an eighth attenuator to the first attenuation value. This can be done to reduce the side lobes of the pencil-beam radiation pattern.

The architecture described herein is not limited by only 8 antenna elements, as shown in FIG. 1B with 4 channels and 2 MIMO chains. Alternatively, the architecture can be expanded to M×Q antenna elements (M channels and Q MIMO chains) for even higher gain applications. That is, the first beamformer circuit 114 can include up to M channels for one MIMO chain and additional beamformer circuits can be used for up to Q MIMO chains being used. To accommodate power distribution to M channels, a power splitter of 1 to M is needed and each channel includes a phase shifter and an optional attenuator.

As described herein, the first beamformer circuit 114 (and the second beamformer circuit 116) can be a customized IC that includes power distribution and a phase shifter network with or without attenuation.

Figure 2:
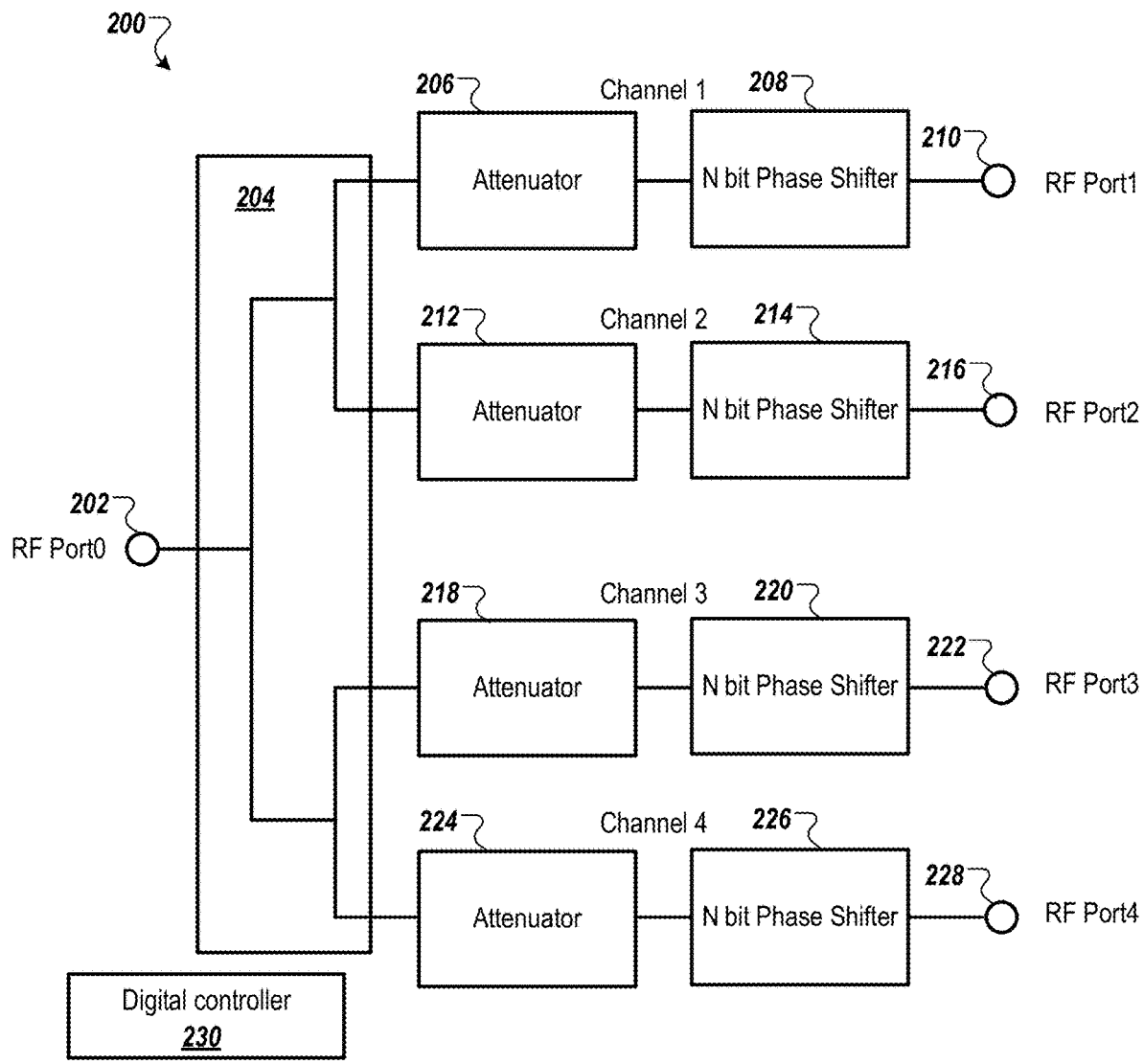
FIG. 2 is a block diagram of a beamformer integrated circuit (IC) for four channels according to one embodiment.

FIG. 2 is a block diagram of a beamformer integrated circuit (IC) 200 for four channels according to one embodiment. The beamformer IC 200 include a first RF port 202 that is coupled to a 1-4 power splitter 204 (also referred to as 1-4 power combiner) that creates 4 channels. The first channel includes a first attenuator 206 and a first N-bit phase shifter 208. The first channel is coupled to a second RF port 210. The second channel includes a second attenuator 212 and a second N-bit phase shifter 214. The second channel is coupled to a third RF port 216. The third channel includes a third attenuator 218 and a third N-bit phase shifter 220. The third channel is coupled to a fourth RF port 222. The fourth channel includes a fourth attenuator 224 and a fourth N-bit phase shifter 226. The fourth channel is coupled to a fifth RF port 228.

As described above, the beamformer IC 200 can be digitally controlled via a digital control interface. In one embodiment, the beamformer IC 200 includes a digital controller 230 for the digital control. The digital controller 230 can be coupled to a digital controller of a radio via a digital control interface, such as digital serial control interface that use the I²C technology. The digital controller 230 can control the N-bit phase shifters to provide up to $2^{4*N}$ different phase combinations to steer a radiation pattern of an antenna array. In this embodiment, the second RF port 210, the third RF port 216, the fourth RF port 222, and the fifth RF port 228 are individually coupled to an element of the antenna array. In some cases, each of the second RF port 210, the third RF port 216, the fourth RF port 222, and the fifth RF port 228 is coupled to a RF module as described below with respect to FIG. 3.

The beamformer IC 200 is also referred to herein as beamformer chip or beamformer chipset. The beamformer IC 200 can be a low-cost customized four-channel beamformer chip that can reduce cost by more than a tenth of current off-the-shelf devices, that provides performance optimization, provide a reduction in packet size, provide a reduction significant board space (power splitter network), simplify control lines, and provide optional attenuators for further side lobe reduction. Alternatively, the beamformer IC 200 can be expanded to M phase shifters, a 1 to M power splitter, and M attenuators to provide $2^{M*N}$ different phase combinations.

Figure 3:
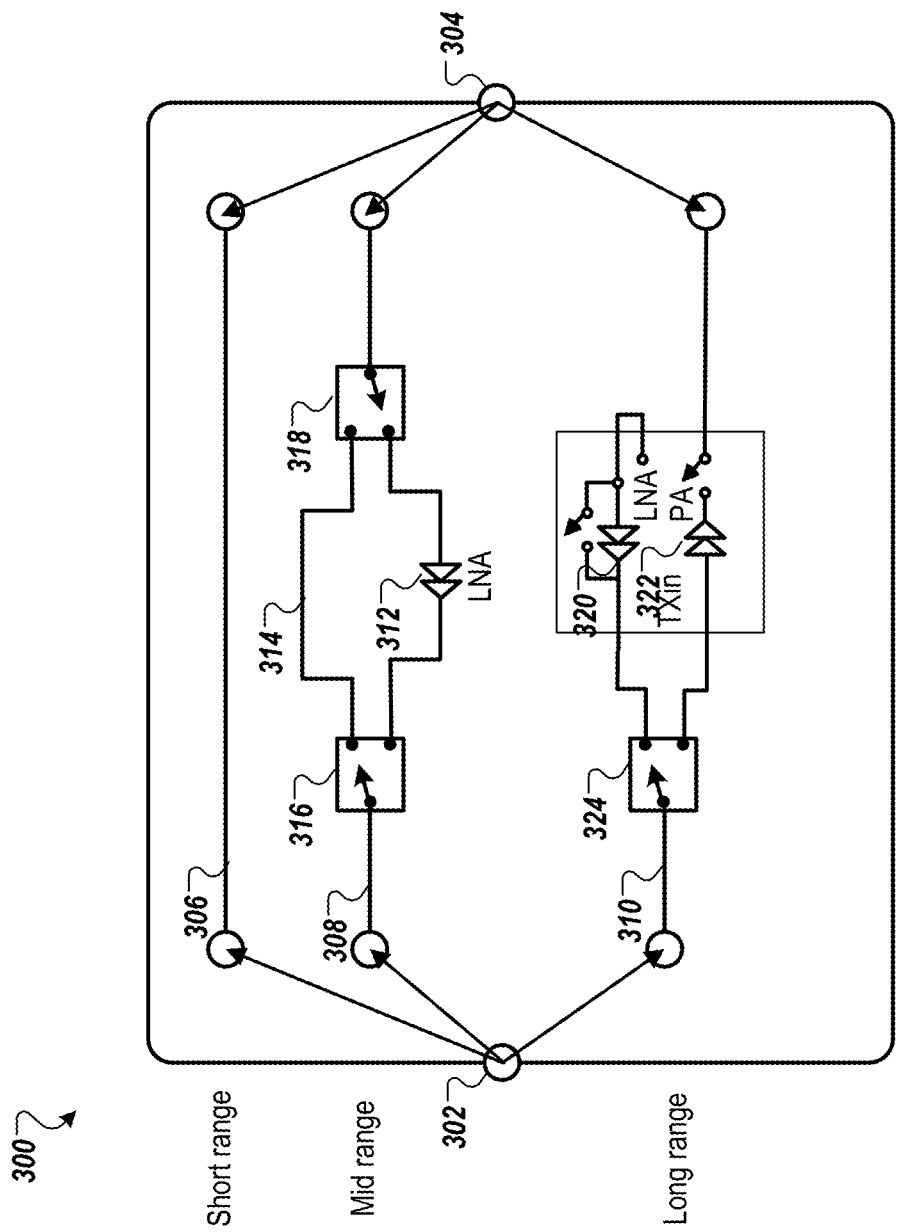
FIG. 3 is a schematic diagram of a RF module, according to one embodiment.

FIG. 3 is a schematic diagram of a RF module 300 according to one embodiment. The RF module 300 can be considered a front-end module or radio frequency front-end (RFFE) circuitry. The RF module 300 can be used for balancing performance and cost. In some cases, where the wireless links are expected to be a short distance, the RF module 300 may not be used at all and the RF port is coupled directly to an antenna element (e.g., referred to as a short-circuit path. In another embodiment where the RF module 300 is coupled between an RF port 302 of the beamformer IC 200 and an antenna element 304 of an antenna array, the short range scenario can be accommodated with a short-circuit path 306, illustrated in FIG. 3.

In addition to the short-circuit path 306, the RF module 300 can provide a second path 308 for mid-range distances, and a third path 310 for long-range distances. The second path 308 includes a first LNA 312 for a receive (RX) mode of a radio and a second short-circuit path 314 for a transmit (TX) mode of the radio. The switches 316 and 318 are used to switch between the first LNA 312 in the RX mode and the short-circuit path 314 in the TX mode. The third path includes a second LNA 320 for the RX mode and a PA 322 for the TX mode. The switch 324 is used to switch between the second LNA 320 for the RX mode and the PA 322 for the TX mode. During operation, the digital controller can send a first distance classifier, a second distance classifier, or a third distance classifier to specify use of one of the first short-circuit path 306, the second path 308, or the third path 310. The distance classifier can specify use of one of the short-circuit path 306, the second path 308, or the third path 310. A distance classifier can be a value (e.g., 0, 1, 2), a description (short range distance, mid-range distance, and long-rang distance), an identifier, or the like.

As described above, the RF module 300 can be used for balancing performance and cost. For the short-range conditions, this is the lowest cost and simplest control as no front-end module is needed or used. The wireless device can still include beamforming capability with interference reduction for the short-range conditions. For the mid-range conditions, the wireless device can still have low power consumption and high sensitivity since the LNA is used for all antenna elements. The wireless device can still include beamforming capability with interference reduction for the mid-range conditions. For the long-range conditions, the wireless device can still have the highest performance, but with higher power, since the LNA and PA in the front-end module are used at each antenna element. The wireless device can still include beamforming capability with interference reduction for the long-range conditions. In other embodiments, the individual paths 306, 308, and 310 can be fixed for a particular design. That is, if the wireless device is expected to operate in short-range conditions, no RF module is used. If a wireless device is expected to operate in mid-range or long-range conditions, the RF module 300 with either the second path 308 or the third path 310 is included. In other cases, the RF module 300 includes only the second path 308 and the third path 310 since the second path includes a short-circuit path can be used for short-range conditions.

Figure 4:
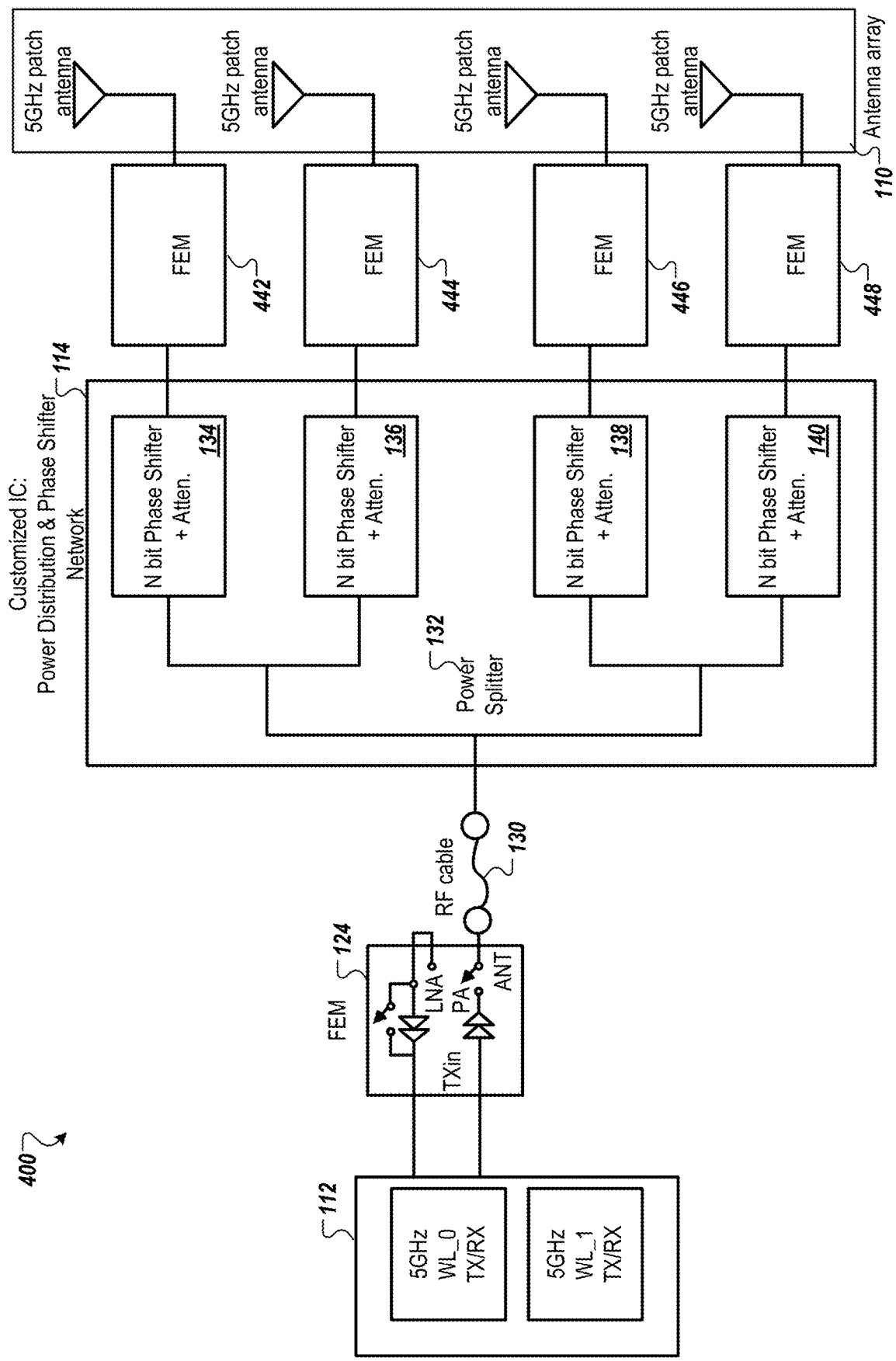
FIG. 4 is a block diagram of a scalable architecture of a wireless device for sectorized analog beam searching, according to another embodiment.

FIG. 4 is a block diagram of a scalable architecture of a wireless device 400 for sectorized analog beam searching, according to another embodiment. The wireless device 400 is similar to the wireless device 100B of FIG. 1B, as noted by the same reference labels. In the wireless device 400 uses a FEM instead of a RF module after the beamforming network. The FEM after the beamforming network can be used to recover from losses, such as the equivalent isotropic radiated power (EIRP) and equivalent isotropic sensitivity (EIS) losses caused by the first RF cable 130 and the beamforming network of the first beamformer circuit 114.

The FEM can include a power amplifier and a LNA to add gain to the channels to recover loss caused by the RF cable 130 and the beamforming network. For example, the RF cable 130 can lose up to 20 dB and the beamforming network loss can be between 3 to 10 dB. It should be noted that the first MIMO chain 124 can be a first FEM before the RF cable 130 and the beamforming network and the FEM can be a second FEM for each of the respective channels.

As illustrated, first FEM 442 is coupled between the first attenuator and phase shifter 134 of the first beamformer circuit 114 and the first element of the first antenna array 110. A second FEM 444 is coupled between the second attenuator and phase shifter 136 of the first beamformer circuit 114 and the second element of the first antenna array 110. A third FEM 446 is coupled between the third attenuator and phase shifter 138 of the first beamformer circuit 114 and the third element of the first antenna array 110. A fourth FEM 448 is coupled between the fourth attenuator and phase shifter 140 of the first beamformer circuit 114 and the fourth element of the first antenna array 110.

Although not illustrated, similar FEMs can be used for the second beamformer circuit 116 described with respect to FIG. 1B as well.

Figure 5:
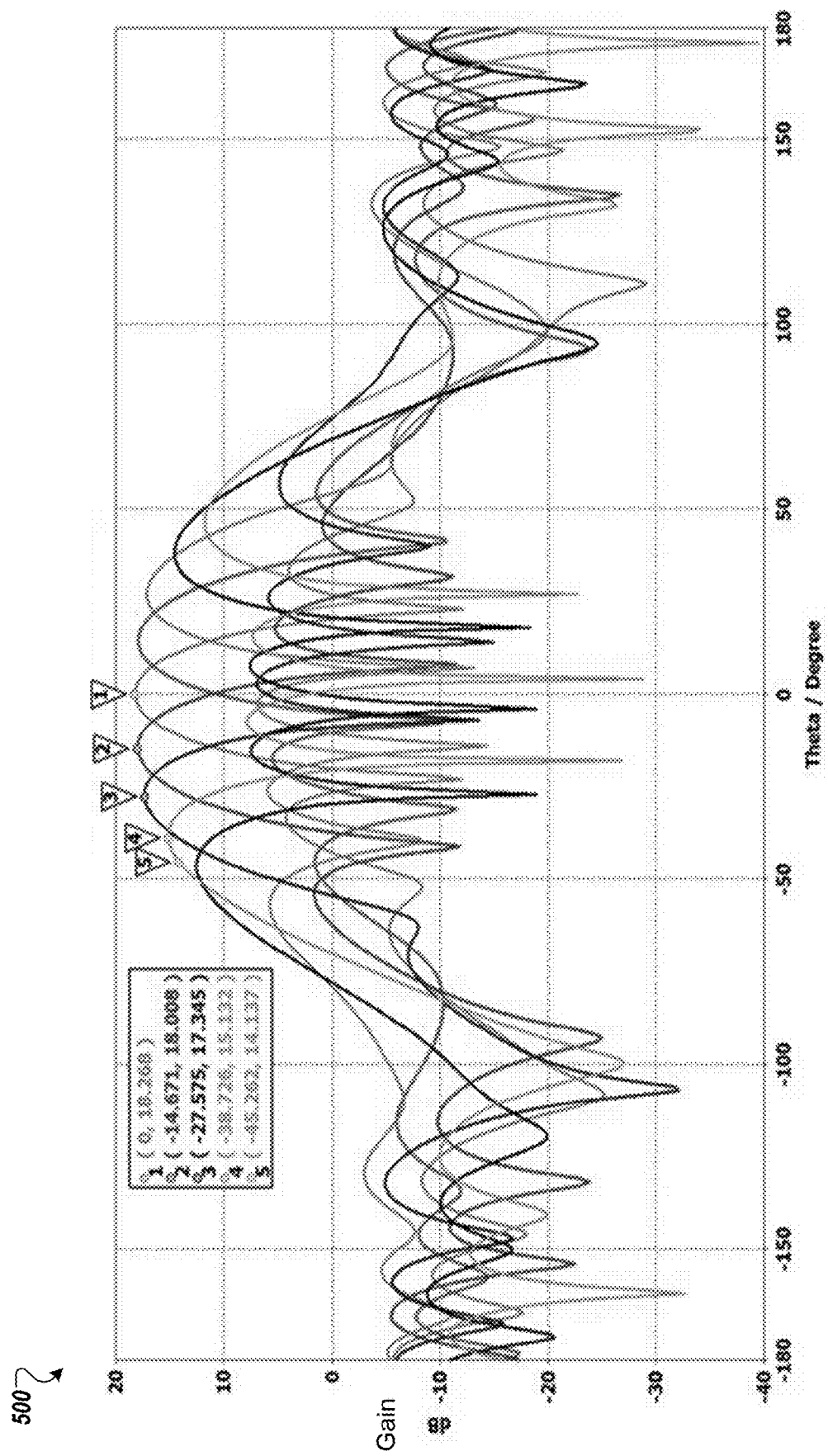
FIG. 5 is a graph illustrating beam-steering with different phase status according to one embodiment.

FIG. 5 is a graph 500 illustrating beam-steering with different phase status according to one embodiment. The graph 500 shows beam-steering at a first angle 502, zero degrees as a first phase status. At the first angle 502, there is a main lobe that peaks at approximately 18.268 dB, as well as side lobes that are 5 dB or less. As described herein, the phase status can be controlled to different angles. As illustrated in FIG. 5, the beam-steering can be adjusted plus or minus 45 degrees with a 4 dB gain reduction. As illustrated, at a second angle 504, approximately −14.671 degrees, there is a main lobe that peaks at approximately 18.008 dB. At a third angle 506, approximately −27.575 degrees, there is a main lobe that peaks at approximately 17.345 dB. At a fourth angle 508, approximately −38.726 degrees, there is a main lobe that peaks at approximately 15.132 dB. At a fifth angle angel 510, approximately −45.262 degrees, there is a main lobe that peaks at approximately 14.137 dB. There is approximately 4 dB gain reduction between the first angle 502 and the fifth angle 510. Although note labeled, similar results can be found for positive angles up to positive 45 degrees.

Figure 6:
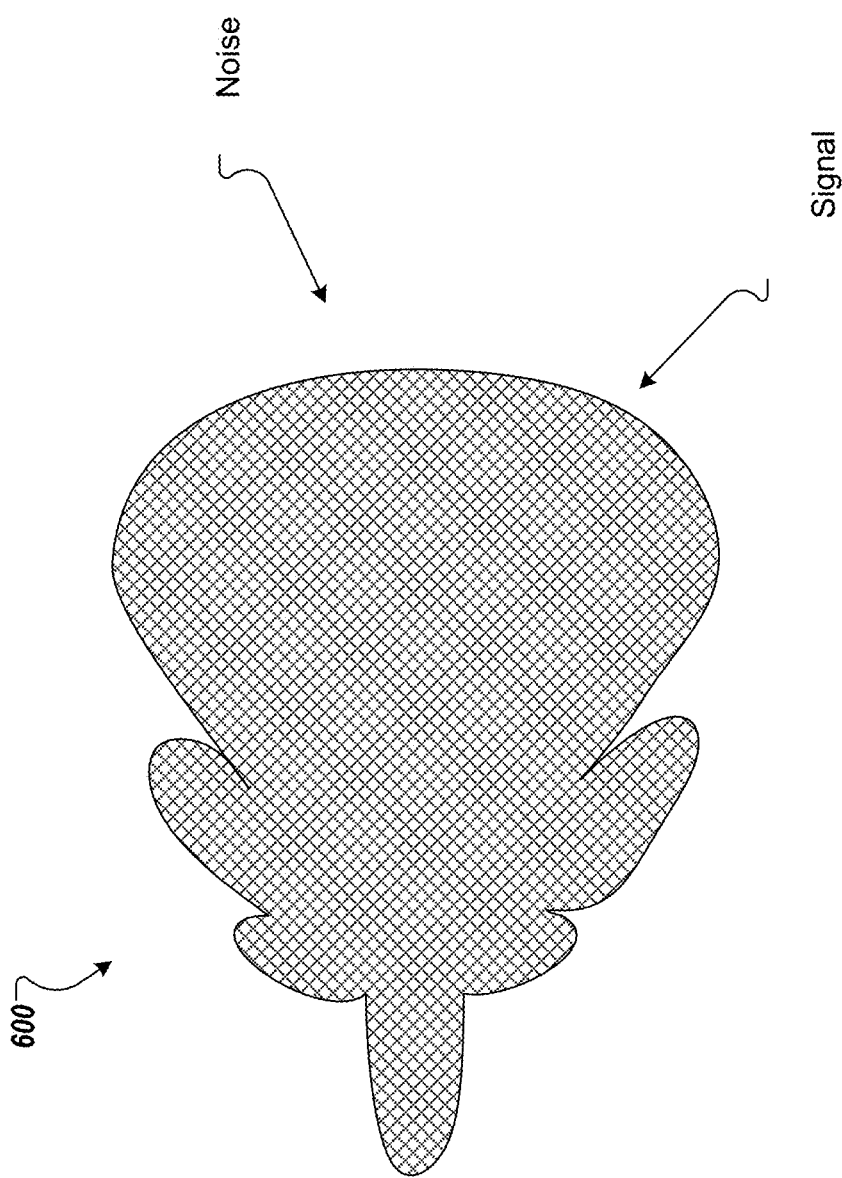
FIG. 6 illustrates a fan-beam radiation pattern according to one implementation.

FIG. 6 illustrates a fan-beam (more generally a broad-angle radiation pattern) radiation pattern 600 according to one implementation.

Figure 7:
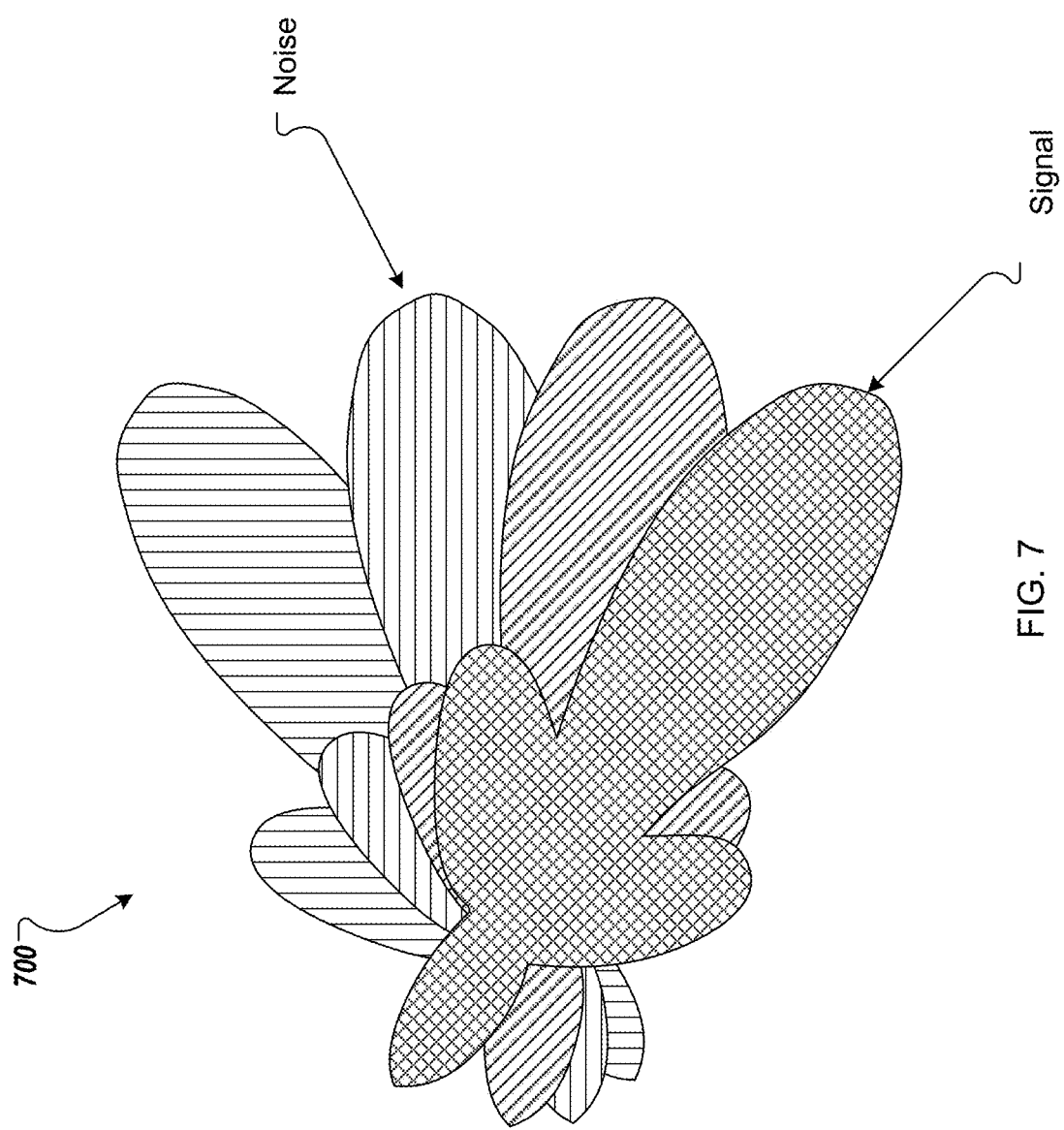
FIG. 7 illustrates a pencil-beam radiation pattern according to one implementation.

FIG. 7 illustrates a pencil-beam (more generally a narrow-beam radiation pattern) radiation pattern 700 according to one implementation. As illustrated in FIGS. 6-7, the pencil-beam radiation pattern 700 has the same coverage, but lower interference because of a sharper beam width for the signal.

Antenna alignment between a base station node (BSN) and a relay node (RLN) is difficult and time consuming. A "node" is a logical network building block that is subdivided into "infrastructure" (e.g., BSNs, RLNs, or the like) and "customer premises equipment (CPE)." A BSN can be a node of one or more devices that are programmed to connect to an Internet Service Provider (ISP) ingress, such as via a router device, and provide coverage to other downstream devices, such as BS coverage to one or more RLNs and/or gateway coverage to one or more CPE nodes. An RLN can be a node of one or more devices that are programmed to connect to a BSN and provide gateway coverage to one or more CPEs. A CPE can be a node of one or more customer stations that are programmed to provide one or more access points for one or more endpoint devices at a customer premises. The base station (BS) coverage and the gateway coverage can be wireless services that provide backhaul for the wireless network, whereas the CPEs provide wireless service as APs in the wireless network. Each node can include one or more wireless network devices, one or more storage devices, and a network switch that connects each of the devices when there are multiple devices in the node. In some cases, the BSN includes a BS device that performs the BS functionality and a gateway device that performs the gateway functionality for any connected CPEs. Similarly, the RLN includes a RL device that performs the RL functionality and a gateway device that performs the gateway functionality for any connected CPEs. Alternatively, the BSN can include a single device, referred to as a BS device. Similarly, the RLN can include a single device, referred to as RL device. Aspects of the present disclosure overcome the deficiencies of both the digital analog beamformers and conventional analog beamformers by providing a coordinated sectorized analog beam search. The coordinated Sectorized analog beach search dynamically adjusts a per-packet analog beam using the analog beamformer hardware (as described above with respect to FIGS. 1B-7) and a neighbor lookup database generated using sectorized analog beach search and web-based coordination (e.g., a cloud coordinator service) as described below with respect to FIGS. 7-17.

Figure 8:
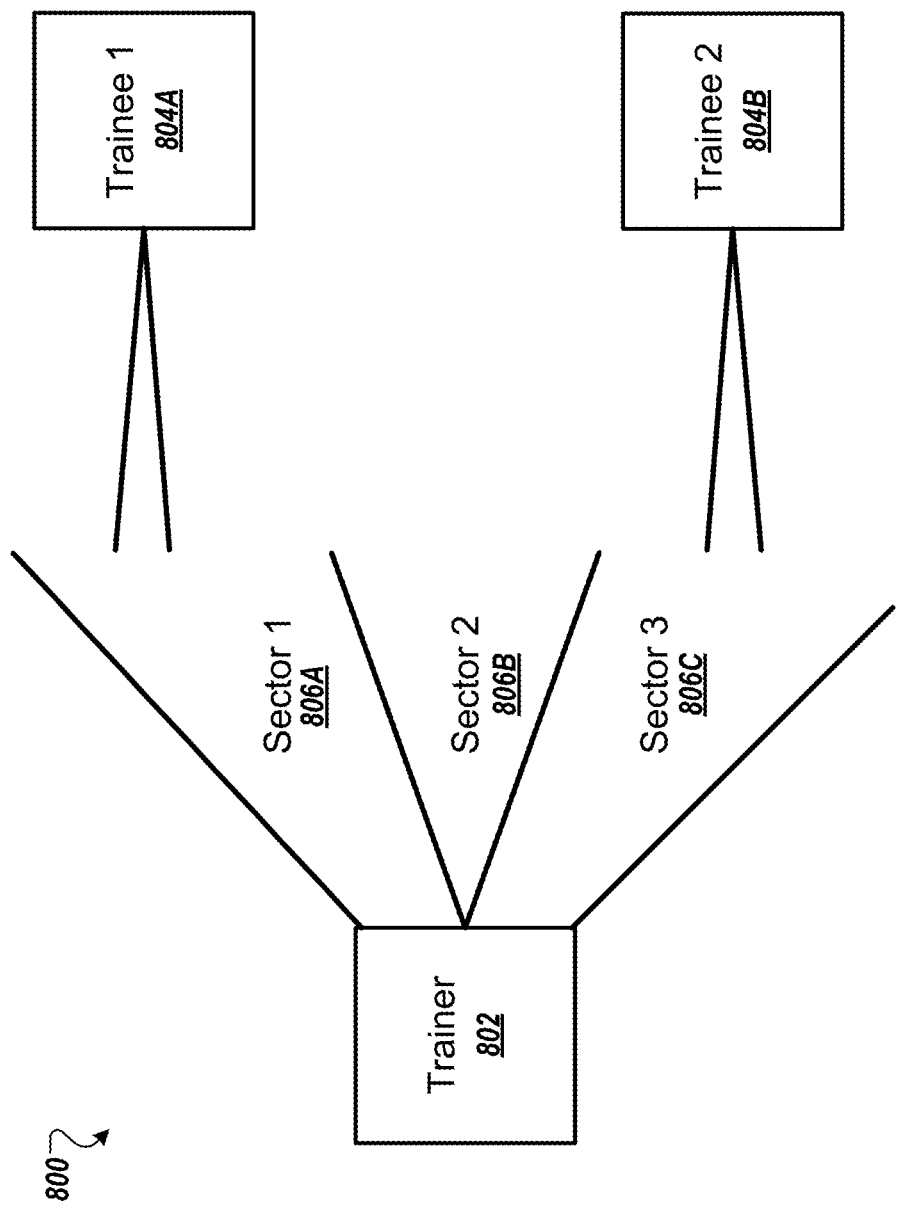
FIG. 8 is a network diagram of a trainer device and multiple trainee devices of a sectorized analog beam search system, according to one embodiment.

FIG. 8 is a network diagram of a trainer device 802 and multiple trainee devices 804A-B of a sectorized analog beam search system 800, according to one embodiment. The S\sectorized analog beam search system 800 may carry out a training procedure to determine one or more beamforming configurations of a trainer device 802 and one of the trainee devices (e.g., trainee device 804A). The trainer device 802 may initiate a swift training phase (e.g., as part of the training procedure). Upon receiving the training initiation data (e.g., a trainer sector table and a trainee list), the trainer device 802 adds trainee IDs to a beacon (e.g., as information elements of a data packet). The trainee listens for one or more beacons that include an associated information element to identify the trainee device to participate with the trainer device.

The training process of identifying training may be performed across multiple beamforming configuration sectors. A sector 806A-C may include one or more of a selection of phase shifter values, a selection of attenuator values, and/or a selection of amplitude values of a beamforming configuration. For example, a first sector 806A may include a first phase shifter angle value and a corresponding beamwidth that spans a sector space (e.g., a geographic region) such as between phase shifter angle values between x Degrees and y Degrees. In another example, a second sector 806B may a first attenuation value. In some embodiments a first sector may be associated with a beam having a beamwidth equal to another beamwidth of a signal associated with a second sector.

In some embodiments, as discussed previously, the trainer device 802 may include one or more elements and/or features of wireless device 100B and/or 400 of FIGS. 1B and 4. Trainer device 802 may receive first beamforming configuration data associated with a first sector 806A. The first beamforming configuration data may include a first selection of one or more phase shifter angle values, attenuation values, amplitude values, and/or other beamforming configuration parameter values. The first selection of values may be associated with generating a wide angle radiation pattern by one or more antenna elements. For example, as shown in FIG. 6A, the trainer device may propagate fan-beam radiation pattern 600. The wide beam radiation pattern may be less attenuated than a narrow beam (e.g., a pencil-beam radiation) propagating in an analogous direction.

Each sector 806A-C may be associated with a geographic region proximate the trainer device 802. In some embodiments, each sector may comprise a subset of beamforming configuration search space (e.g., a first geographic region, a second geographic region, a third geographic region, and so forth). For example, a first sector 806A may be associated with beams comprising phase shifter angles values between 0 and 120 Degrees, a second sector 806B may be associated with beams comprising phase shifter angle values between 120 Degrees and 240 Degrees, and a third sector 806C may be associated with beams comprising phase shifter angle values between 240 Degrees and 360 Degrees. In some embodiments, the sector make up various beamforming configuration windows of a targeted beamforming configuration searching subset. For example, a targeted beam searching subset may include beam configurations comprising phase shifter angle values between 0 and 3 Degrees, a first sector 806A may be associated with beams comprising phase shifter angles values between 0 and 1 Degrees, a second sector 806B may be associated with beams comprising phase shifter angle values between 1 Degrees and 2 Degrees, and a third sector 806C may be associated with beams comprising phase shifter angle values between 2 Degrees and 3 Degrees, wherein configurations including phase shifter angle values outside the window between 0 and 3 Degrees are outside the targeted beam searching configuration subset.

Figure 9:
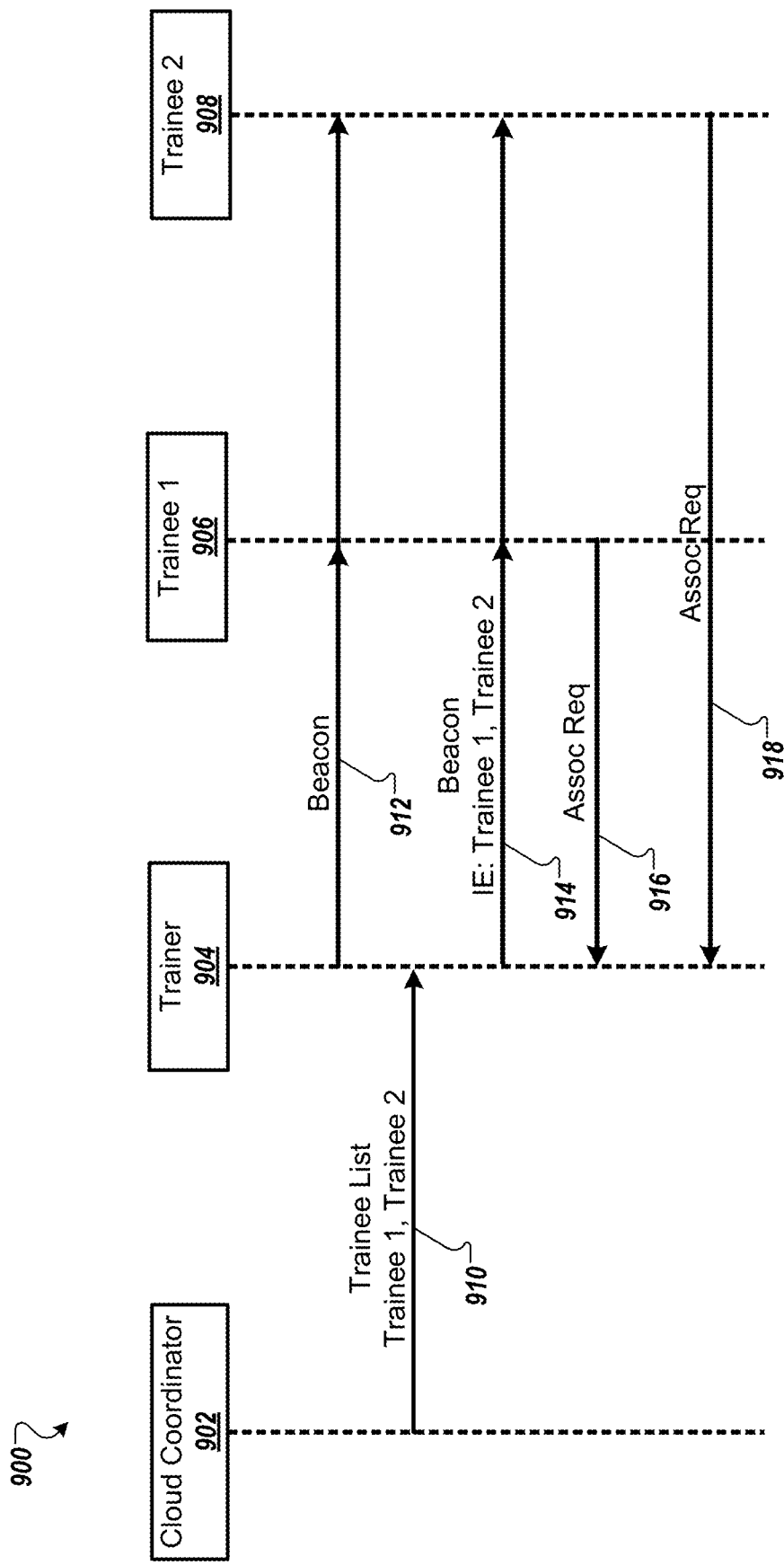
FIG. 9 depicts a sectorized analog beam search process between a cloud coordinator device, a trainer device, and multiple trainee devices, according to one embodiment.

FIG. 9 depicts a sectorized analog beam search process 900 between a cloud coordinator device 902, a trainer device 904, and multiple trainee devices 906, 908, according to one embodiment. The Sectorized analog beam search process 900 may be performed among multiple wireless devices (e.g., wireless device 100B, 400). For example, one or more of the cloud coordinator device 902, trainer device 904, and trainee devices 906, 908 may include one or more features of wireless devices 100B and 400 from FIGS. 1B and 4, respectively.

As shown in FIG. 9, the trainer device 904 may send first data 912 to a first trainee device 906 and a second trainee device 908. The first data may be send using a beacon signal from the trainer device 904. The first data may be ignored by the first trainee device 906 and the second trainee device 908 absent identification data associated with the first trainee device 906 and the second trainee device 908.

The cloud coordinator may send second data 910 to the trainer device 904. The second data 910 may include a frame indicative of a trainer sector table and/or a list of trainee devices. The list of trainee devices may include one or more destination address (e.g., network addresses such as a MAC address) associated with each of the trainee devices 906, 908. The sector table may include a list of a sector IDs and an associated beamforming configuration (e.g., broad-angle beam radiation patterns) for each sector ID. As discussed previously, each sector may be associated with a set of beamforming configurations (e.g., pencil-beam radiation patterns) of a wireless device.

The trainer device 904 adds the trainee IDs to the beacon and sends third data 914 to the first trainee device 906 and the second trainee device 908. For example, the updated beacon signal may include a first frame identifying upcoming frames as having a trainee device list, a second frame indicating a length of the trainee list, and a third frame enumerating one or more IDs of the trainee device 906, 908. The trainee devices 906, 908 listen for a beacon having one or more data frames indicating an associated device identification respective to each trainee device 906, 908. The first trainee device sends fourth data 916 to the trainer device 904. The fourth data 916 includes a frame indicating an association request with the trainer device 904. The association request may include processing instructions (e.g., a command) for the trainer device 904 to initiate a first beam searching procedure with the first trainee device 906. The second trainee device 908 sends fifth data 918 to the trainer device 904. The fifth data includes a frame indicating an association request with the trainer device 904. The association request may include processing instructions (e.g., a command) for the trainer device 904 to initiate a first beam searching procedure with the second trainee device 908.

The trainer device 904, responsive to sending third data 914 to the first trainee device 906 and the second trainee device 908, maintains an alert status and/or listens for association requests from the trainee devices 906, 908 corresponding to the trainee devices 906, 908 receiving the third data 914.

In some embodiments, the sectorized analog beam search process 900 is performed over multiple iterations associated with a number of beamforming configurations. For example, the second data 910 may indicate one or more sector IDs and one or more beamforming configurations associated with the one or more sector IDs (e.g., a sector table). The beacon generated by trainer device 904 may be updated such that the signal is generated with a wide-angle beam radiation pattern associated with a first sector. For example, as previously discussed, a first sector may be associated with a first set of beamforming configurations (e.g., a selection a phase shifter angle values, attenuation values, amplifier values). The trainer device 904 may generate a first broad-angle beam radiation pattern (e.g., using beamforming methodology and/or structural element described in association with FIG. 1B) representative of the first set of pencil-beam radiation pattern beamforming configurations of the first sector. Association requests of the fourth data 916 and the fifth data 918 may include processing instructions (e.g., a command) for the trainer device 904 to initiate a second beam searching procedure with the trainee devices 906, 908. The second beam searching procedure may be associated with the first sector. For example, beam searching of one of the trainer device 904 and any of the trainee devices 906, 908 may be focused and/or otherwise limited to a set of beamforming configuration associated with the first sector.

The sectorized analog beam search process 900 may include another iteration associated with a second beamforming configuration sector. For example, the trainer device 904 may generate a second broad-angle beam radiation pattern (e.g., using beamforming methodology and/or structural elements described in association with FIG. 1B) representative of a second set of beamforming configurations associated with the second sector. Association requests of the fourth data 916 and the fifth data 918 may include processing instructions (e.g., a command) for the trainer device 904 to initiate a third beam searching procedure with the trainee devices 906, 908. The third beam searching procedure may be associated with the second sector. For example, beam searching of one of the trainer device 904 and any of the trainee devices 906, 908 may be focused and/or otherwise limited to a set of beamforming configuration associated with the second sector.

In some embodiments, the sectorized analog beam search process 900 may be repeated for any number of beamforming configuration sectors. The identified first, second, and/or third beam searching procedure may be proceeded with one or features (e.g., process steps) identified in FIGS. 10 and/or 11. For example, the Sectorized analog beam search process 900 may be a first stage of a larger sectorized analog beam search process.

Figure 10:
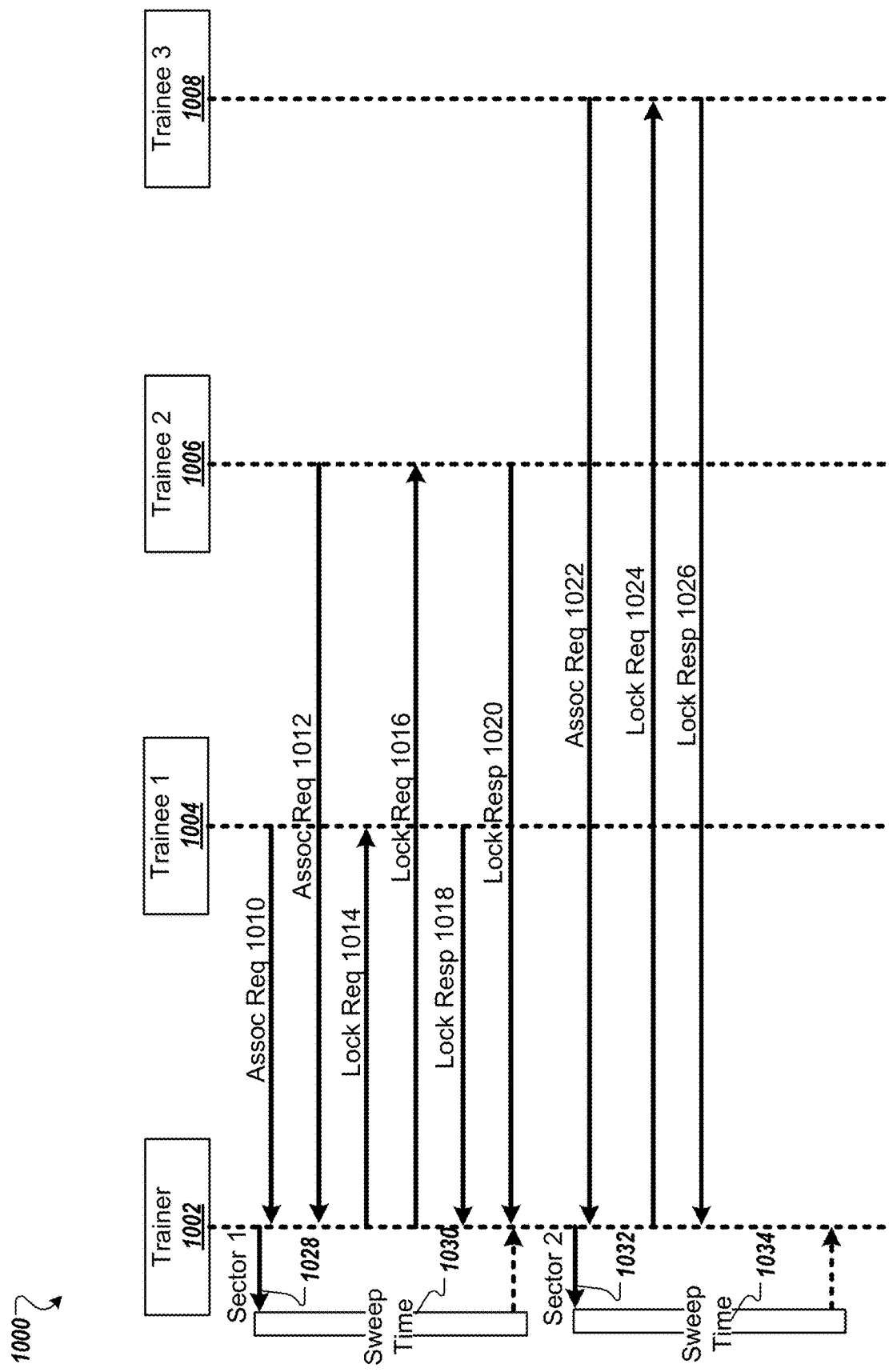
FIG. 10 depicts a training procedure of a sectorized analog beam search process, according to one embodiment.

FIG. 10 depicts a training procedure 1000 of a sectorized analog beam search process, according to one embodiment. As shown in FIG. 10 the training procedure 1000 may be performed between a trainer device 1002 and one or more trainee devices 1004, 1006, 1008. The training procedure 1000 may be performed among multiple wireless devices (e.g., wireless device 100B, 400). For example, one or more of trainer device 1002 and one or more trainee devices 1004, 1006, 1008 may include one or more features of wireless devices 100 and 400 from FIGS. 1B and 4, respectively.

As shown in FIG. 10, the trainer device 1002, operating using a first beamforming configuration 1028 associated with a first sector for a first time duration (e.g., sweep time 1030), receives first data 1010 from the first trainee device 1004. The first data 1010 includes a frame indicating an association request with the trainer device 1002. The association request may include processing instructions (e.g., a command) for the trainer device 1002 to initiate a first beam searching procedure with the first trainee device 1004. Responsive to receiving the first data 1010, the trainer device 1002 sends third data 1014 to the first trainee device 1004. The third data 1014 includes a frame indicating a lock request associated with trainer device 1002. The lock request includes a request to initiate a first training procedure. In some embodiments, the lock request may include a time duration associated with the first training procedure. For example, the time duration may correspond to a duration of time the trainer device 1002 maintains a consistent beamforming configuration (e.g., a beamforming configuration associated with a first beamforming configuration sector). In another example, the duration of time may correspond to a minimum amount of time the first trainee device 1004 has to complete the first training procedure (e.g., before being timed out, remaining time left on the total sweep time 1030).

During the first training procedure, the first trainee device 1004 performs a beamforming configuration sweep across a set of beamforming configurations. For example, the first trainee device, may steer a beam (e.g., a pencil-beam radiation pattern) by altering various beamforming parameters such as a phase shifter angle value, an attenuation value, and/or an amplifier value of the steerable beam. The first trainee device 1004 determines a first beamforming configuration of the set of beamforming configurations based on a signal quality metric value. For example, the first trainee device 1004 measures an RSSI value and/or an SNR value associated with signal reception of the third data 1014 by the first trainee device 1004 for each of the set of operable beamforming configurations. The determined first beamforming configuration may be selected based on the first trainee device measuring one or more of the highest signal quality metric values (e.g., above a signal quality threshold) when the first trainee device 1004 is operating in the first beamforming configuration. The first trainee device 1004 may send fifth data 1018 to the trainer device 1002. The fifth data 1018 may indicate a first training result of the first training procedure. The first training result may indicate the first beamforming configuration.

As shown in FIG. 10, the trainer device 1002, operating using a first beamforming configuration associated 1028 with a first sector for a first time duration (e.g., sweep time 1030), receives second data 1012 from the second trainee device 1006. The second data 1012 includes a frame indicating an association request with the trainer device 1002.

The association request may include processing instructions (e.g., a command) for the trainer device 1002 to initiate a second beam searching procedure with the second trainee device 1006. Responsive to receiving the second data 1012, the trainer device sends fourth data 1016 to the second trainee device 1006. The fourth data 1016 includes a frame indicating a lock request associated with trainer device 1002. The lock request includes a request to initiate a first training procedure between the trainer device 1002 and the second trainee device 1006. In some embodiments, the lock request may include a time duration associated with the first training procedure. For example, the time duration may correspond to a duration of time the trainer device 1002 maintains a consistent beamforming configuration (e.g., a beamforming configuration associated with a first beamforming configuration sector). In another example, the duration of time may correspond to a minimum amount of time the second trainee device 1006 has to complete the second training procedure (e.g., before being timed out, remaining time left on the total sweep time 1030).

During the second training procedure, the second trainee device 1006 performs a beamforming configuration sweep across a set of beamforming configurations. For example, the second trainee device 1006, may steer a beam (e.g., a pencil-beam radiation pattern) formed by a radiation pattern of electromagnetic energy by altering various beamforming parameters such as a phase shifter angle value, an attenuation value, and/or an amplifier value associated with the generation of the steerable beam. The second trainee device 1006 determines a second beamforming configuration of the set of beamforming configurations based on a signal quality metric. For example, the first trainee device measures an RSSI value and/or an SNR value associated with signal reception of the second trainee device 1006 for each of the set of operable beamforming configurations. The determined second beamforming configuration may be selected based on the second trainee device 1006 measuring one or more of the highest signal quality metric values (e.g., above a signal quality threshold) when the first trainee device is operating in the first beamforming configuration. The second trainee device 1006 may send sixth data 1020 to the trainer device 1002. The sixth data 1020 may indicate a second training result of the second training procedure. The second training result may indicate the second beamforming configuration.

As shown in FIG. 10, the trainer device 1002, changes from the first beamforming configuration to a second beamforming configuration 1032 associated with a second sector for a second time duration (e.g., sweep time 1034), receives seventh data 1022 from the third trainee device 1008. The seventh data 1022 includes a frame indicating an association request with the trainer device 1002. The association request may include processing instructions (e.g., a command) for the trainer device 1002 to initiate a third beam searching procedure with the third trainee device 1008 using a third beamforming configuration associated with the second beamforming configuration sector 1032. Responsive to receiving the seventh data 1022, the trainer device 1002 sends eighth data 1024 to the third trainee device 1008. The eighth data 1024 includes a frame indicating a lock request associated with trainer device 1002. The lock request includes a request to initiate a first training procedure between the trainer device 1002 and the third trainee device 1008. In some embodiments, the lock request may include a time duration associated with the third training procedure. For example, the time duration may correspond to a duration of time the trainer device 1002 maintains a consistent beamforming configuration (e.g., a beamforming configuration associated with a second beamforming configuration sector). In another example, the duration of time may correspond to a minimum amount of time the third trainee device 1008 has to complete the third training procedure (e.g., before being timed out, remaining time left on the total sweep time 1034).

During the third training procedure, the third trainee device 1008 performs a beamforming configuration sweep across a set of beamforming configurations. For example, the third trainee device 1006, may steer a beam (e.g., a pencil-beam) formed by a radiation pattern of electromagnetic energy by altering various beamforming parameters such as a phase shifter angle value, an attenuation value, and/or an amplifier value associated with the generation of the steerable beam. The third trainee device 1008 determines a third beamforming configuration of the set of beamforming configurations based on a signal quality metric. For example, the third trainee device 1008 measures an RSSI value and/or an SNR value associated with signal reception of the third trainee device 1008 for each of the set of operable beamforming configurations. The determined third beamforming configuration may be selected based on the third trainee device 1008 measuring one or more of the highest signal quality metric values (e.g., above a signal quality threshold) when the third trainee device 1008 is operating in the third beamforming configuration. The third trainee device 1008 may send ninth data 1026 to the trainer device 1002. The ninth data 1026 may indicate a third training result of the third training procedure. The third training result may indicate the third beamforming configuration.

In some embodiments, one or more beamforming messaging packets (e.g., first data 1010, second data 1012, third data 1014, fourth data 1016, fifth data 1018, sixth data 1020, seventh data 1022, eighth data 1024, and/or ninth data 1026) may include an Internet Control Message Protocol (ICMP) packet. The IMCP packet may include a frame that indicates one of more of the first training result (e.g., the first beamforming configuration), the second training result (e.g., the second beamforming configuration), and/or the third training results (e.g., the third beamforming configuration). In some embodiments, one or more beamforming messaging packets (e.g., first data 1010, second data 1012, third data 1014, fourth data 1016, fifth data 1018, sixth data 1020, seventh data 1022, eighth data 1024, and/or ninth data 1026) may include other messaging protocols (e.g., transmission control protocol (TCP) or user datagram protocol (UDP)).

In some embodiments, the trainer device 1002 listens for associating requests (e.g., first data 1010 and second data 1012) from the trainee devices 1004, 1006. Responsive to receiving the association requests, the trainer device 1002 sends (e.g., using an ICMP request packet) an associated lock request (e.g., third data 1014, fourth data 1016) to the associated trainee device 1004, 1006 to lock the current beamforming configuration of the associated trainee device 1004, 1006. Once the lock response(s) (e.g., fifth data 1018, sixth data 1020) is received (e.g., using a ICMP response packet) by the trainer device 1002, the trainer device stores an associated trainee ID, sector ID, and signal quality metric value (e.g., RSSI value or SNR value) in a table (e.g., a swift training table). The trainer device then switches to the next sector from a received sector ID list and stores RSSI in the swift training table. Training procedure 1000 may be leveraged to identify a sector associated with each trainee device 1004, 1006, 1008 with the highest beam quality metric value for each trainee device 1004, 1006, 1008.

Figure 11:
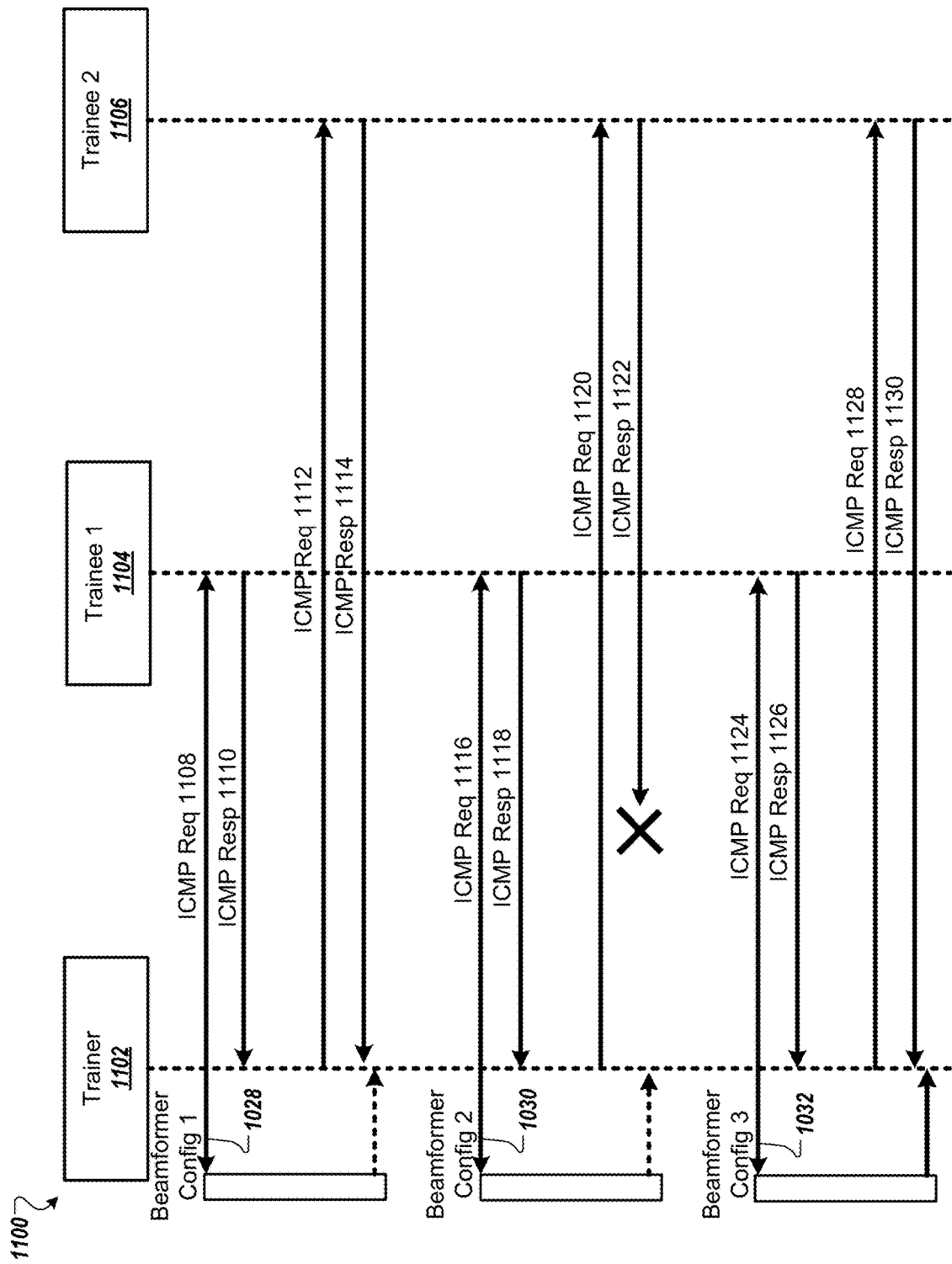
FIG. 11 depicts a training procedure of sectorized analog beam search process, according to one embodiment.

FIG. 11 depicts a training procedure 1100 of Sectorized analog beam search process, according to one embodiment. As shown in FIG. 11 the training procedure 1100 may be performed between a trainer device 1102 and one or more trainee devices 1104, 1106. The training procedure 1100 may be performed among multiple wireless devices (e.g., wireless device 100B, 400). For example, one or more of trainer device 1102 and one or more trainee devices 1104, 1106 may include one or more features of wireless devices 100 and 400 from FIGS. 1B and 4, respectively.

As shown in FIG. 11, trainer device 1102 may communicate using a first beamformer configuration 1028. For example, as described previously, the first beamformer configuration may include one or more parameters such as a first phase shifter angle value, a first attenuation value, and a first amplitude value. The trainer device 1102 may maintain the first beamformer configuration by setting one or more wireless elements (e.g., phase shifters, attenuators, amplifiers) in accordance with the first phase shifter angle value, the first attenuation value, and the first amplitude value and steering a radiation pattern (e.g., pencil-beam radiation) of electromagnetic energy.

As shown in FIG. 11, the trainer device 1102, communicating using a first beamformer configuration 1028, sends first data 1108 including a frame indicating a signal quality request (e.g., an ICMP, TCP, and/or UDP request packet) to the first trainee device 1104. The signal request may include instructions for the first trainee device 1104 to return a signal quality metric value (e.g., an RSSI value or an SNR value). The first trainee device 1104 may send second data 1110 including a frame indicating a signal quality metric value corresponding to the first data 1108 to the trainer device 1102. The trainer device 1102 may store (e.g., in a Neighbor SNR matrix table 1402) the signal quality metric value along with data indicating the first beamforming configuration and a beamforming configuration associated with the first trainee device 1104 used to send second data 1110.

As shown in FIG. 11, the trainer device 1102, communicating using a first beamformer configuration 1028, sends third data 1112 including a frame indicating a signal quality request (e.g., an ICMP, TCP, and/or UDP request packet) to the second trainee device 1106. The signal request may include instructions for the second trainee device 1106 to return a signal quality metric value (e.g., an RSSI value or an SNR value). The second trainee device 1106 may send fourth data 1114 including a frame indicating a signal quality metric value corresponding to the third data 1112 to the trainer device 1102. The trainer device 1102 may store (e.g., in a Neighbor SNR matrix table 1402) the signal quality metric value along with data indicating the first beamformer configuration and a beamformer configuration associated with the second trainee device 1106 used to send fourth data 1114.

As shown in FIG. 11, the trainer device 1002 may change to a second beamforming configuration 1130. In some embodiments, the trainer device 1102 may determine that all signal quality requests have been responded to and proceeds with configuring the trainer device 1102 to the second beamforming configuration 1130. In some embodiments, the trainer device 1102 sends first data 1108 and second data 1110 and waits a predetermined amount of time before preceding to the second beamforming configuration 1130. For example, one or more of first data and/or or third data may be "timed out" if the second data and/or the fourth data is not received the trainer device in a threshold time duration.

As shown in FIG. 11, the trainer device 1102, communicating using a second beamformer configuration 1130, sends fifth data 1116 including a frame indicating a signal quality request (e.g., an ICMP, TCP, and/or UDP request packet) to the first trainee device 1104. The signal request may include instructions for the first trainee device 1104 to return a signal quality metric value (e.g., an RSSI value or an SNR value). The first trainee device 1104 may send sixth data 1118 including a frame indicating a signal quality metric value corresponding to the fifth data 1116 to the trainer device 1102. The trainer device 1102 may store (e.g., in a Neighbor SNR matrix table 1402) the signal quality metric value along with data indicating the second beamformer configuration and a beamformer configuration associated with the first trainee device 1104 used to send sixth data 1118.

As shown in FIG. 11, the trainer device 1102, communicating using a second beamformer configuration 1028, sends seventh data 1120 including a frame indicating a signal quality request (e.g., an ICMP, TCP, and/or UDP request packet) to the second trainee device 1106. The signal request may include instructions for the second trainee device 1106 to return a signal quality metric value (e.g., an RSSI value or an SNR value). The second trainee device 1106 may send fourth data 1114 including a frame indicating a signal quality metric value corresponding to the third data 1112 to the trainer device 1102. The eighth data 1122 may be received after a threshold time duration (or not at all) from the trainer device 1102 sending the seventh data 1120. Eighth data 1122 may be time out or otherwise not registered by the trainer device 1102.

As shown in FIG. 11, the trainer device 1002 may change to a third beamforming configuration 1132. In some embodiments, the trainer device 1102 may determine that all signal quality requests have been responded to and proceeds with configuring the trainer device 1102 to the third beamforming configuration 1132. In some embodiments, the trainer device 1102 sends fifth data 1116 and seventh data 1120 and waits a predetermined amount of time before preceding to the third beamforming configuration 1132. For example, one or more of fifth data 1116 and/or or seventh data 1120 may be "timed out" if the sixth data 1118 and/or the eight data 1122 is not received by the trainer device in a threshold time duration.

In some embodiments, training procedure 1100 proceed iterating the trainer device between all remaining beamformer configuration. For example training procedure may continue for a third beamforming configuration 1132, a fourth beamforming configuration, a fifth beamforming configuration, and so on. In some embodiments, training procedure 1100 may include more than a first trainee device 1104, and a second trainee device 1106. Additional training device may receive data analogous to first data 1108 and respond with data analogous to second data 1110.

Figure 12:
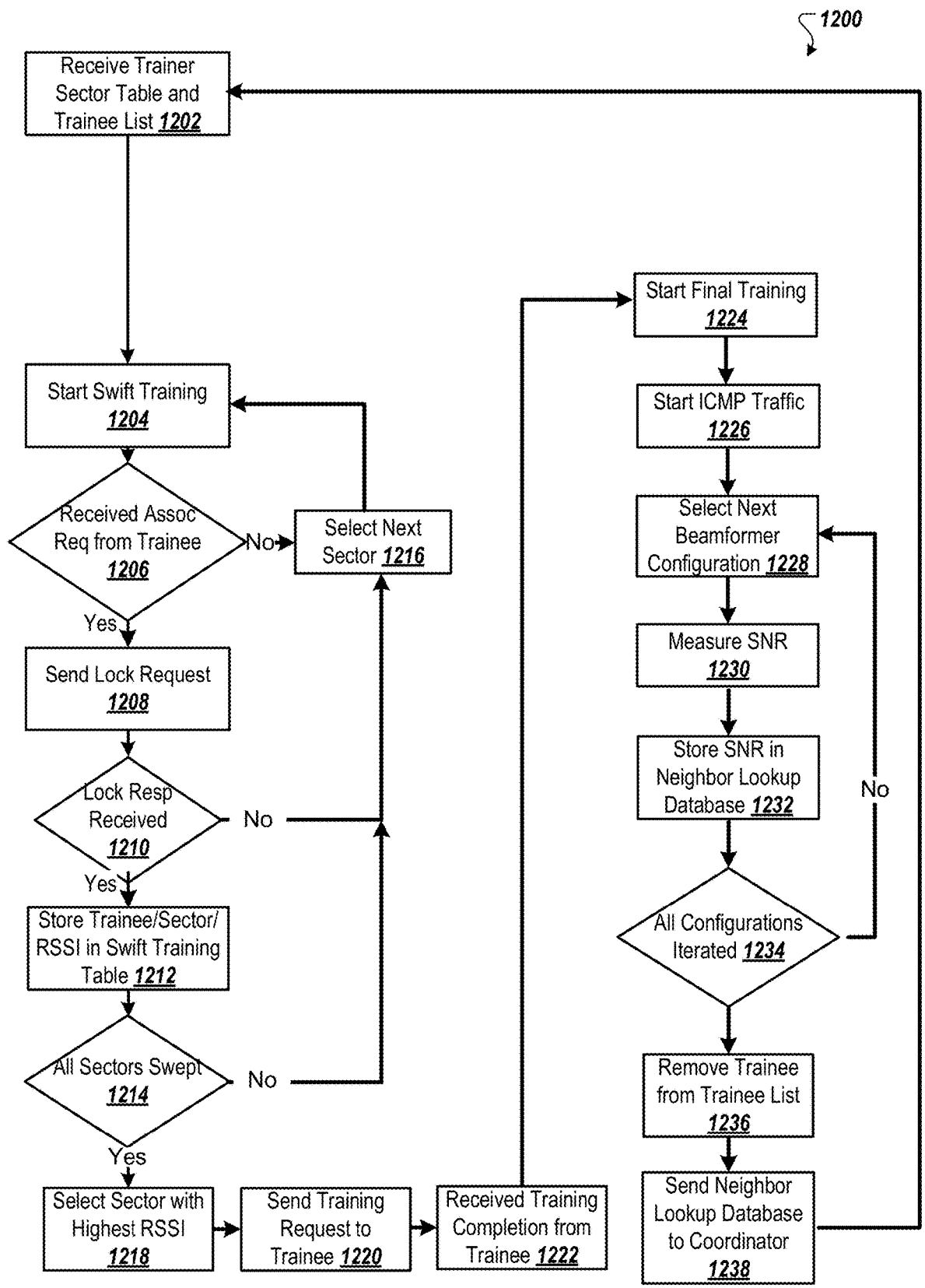
FIG. 12 illustrates a flow diagram of a method of performing a sectorized analog beam search, according to one embodiment.

FIG. 12 illustrates a flow diagram of a method 1200 of performing a sectorized beam search, according to one embodiment. In some embodiments, method 1200 may include processing logic executed by a wireless device such as a trainer device. Referring to FIG. 12, at block 1202 the processing logic receives (e.g., from a cloud coordinator service) training instructions including a trainer sector table and a trainee list, as previously described.

At block 1204, processing logic initiates a swift training procedure. The swift training procedure may include one or more elements of a sectorized analog beam searching process 900 of FIG. 9. Processing logic causes a beacon signal to be broadcast to one or more neighboring wireless devices using a first beamforming configuration (e.g., wide-angle beam radiation pattern) associated with a first sector. The beacon signal may include one or more device IDs of one or more of the neighboring devices. At block 1206, processing logic determines whether one or more association requests from the one or more neighboring devices (e.g., trainee devices) is received. For example, processing logic may listen for one or more association requests. Processing logic may determine that no association requests were received by waiting a threshold time duration (e.g., a beam sweep duration) associated with the first sector. Processing logic may determine that no association requests were received from any of the neighboring devices within a target time window and proceeds along the no path to block 1216. Processing logic may determine the reception of one or more association requests from the one or more neighboring devices and proceeds along the yes path to block 1208.

At block 1216, the swift training procedure continues with the next sector. Processing logic may cause an updated beacon signal to broadcast, the updated beacon signal uses an updated beamforming configuration associated with the next sector (e.g., a first beamforming configuration with the first sector, a second beamforming configuration with the second sector, a third beamforming configuration with the third sector, and so on). Process logic may then perform actions associated with one or more of blocks 1204, 1206, 1208, 1210, 1212, and 1214 using the updated beamforming configuration is association with the next sector.

At block 1208, processing logic may send a lock request to a neighboring device corresponding to one or more of the received association requests. The lock request may include instructions for a neighboring device to sweep across a set of beamforming configurations and identify one of the set of beamforming configurations as meeting a threshold condition. The threshold condition may be associated with a signal quality metric such as an RSSI and/or an SNR of the received beacon signal by the neighboring device using the associated beamforming configuration. The lock request may further include a request for the neighboring device to lock to the associated beamforming configuration for an associated lock duration. At block 1210, processing logic determines whether a lock response has been received. A lock response may indicate successful completion of the beam sweeping procedure and the associated beamforming configuration corresponding to the identified neighboring device. A lock response may also include a value indicating a beam quality metric associated with the neighboring device. Processing logic may determine a lock request has not been received by determining a threshold amount of time (e.g., a lock request time out duration) has occurred without receiving a lock response. Processing logic may determine that a lock request has not been received within the threshold amount of time and may proceed along the no path to block 1216. Processing logic may determine that one or more lock requests are received and proceed to block 1212.

At block 1212, processing logic stores the received beam quality metric value associated with each received lock response and one or more identifying information associated with the swift training table (e.g., sector ID, neighboring device ID, beamforming configuration of the trainer, beamforming configuration of the neighboring device, etc.)

At block 1214, processing logic determines whether all sectors have been swept. Processing logic may determine that all sectors have not been swept and proceed along the no path to block 1216. Processing logic may determine that all sectors have been swept and proceed along the yes path to block 1218.

At block 1218, processing logic may identify a neighboring device and determine the sector with the highest RSSI value (or SNR value) associated with the neighboring device. At block 1220, processing logic sends a training request to the identified neighboring device. At block 1222, processing logic receives a training completion status from the identified training device. At block 1224 processing logic performs a final training procedure. The final training procedure may include one or more elements of training procedure 11 of FIG. 11. Processing logic may initiate ICMP traffic that includes cycling through blocks 1228, 1230, 1232, and 1234 over a set of beamforming configuration associated with a sector. A sector may be associated with a wide-beam configuration pattern than spans over an associated geographic region. The one or more beamforming configurations may be used in the processing loop consisting of blocks 1228, 1230, 1232, and 1234. The one or more beamforming figurations may include one or more narrow-beam (e.g., pencil-beam) radiation patterns that propagates at one or more angles disposed within the associated geographic region.

Processing logic proceeds with selecting the next beamformer configuration (e.g., a narrow-beam radiation pattern propagating at an angle of a geographic region associated with the identified sector from block 1218). Processing logic measures an SNR value (or alternatively or additionally an RSSI value) associated with communicating between a trainer device using the beamformer configuration and the identified neighboring device. Processing logic stores the SNR value in a neighbor lookup data at block 1232. At block 1234, processing logic determines whether all beamforming configurations associated with a sector have been iterated. Processing may determine that all beamforming configuration associated with the sector have not been iterated and proceed along the no path to block 1228. Processing logic may determine that all beamforming configurations associated with the sector have been iterated and proceed along the yes path to block 1236.

At block 1236, processing logic may remove a trainee from a trainee list such as by removing a training ID from the trainee list. At block 1238, processing logic may send a neighbor lookup database to a cloud coordinator service. Processing logic may proceed through method 1200 and associated steps for multiple iteration for each of the trainee devices identified on the trainee list.

Figure 13:
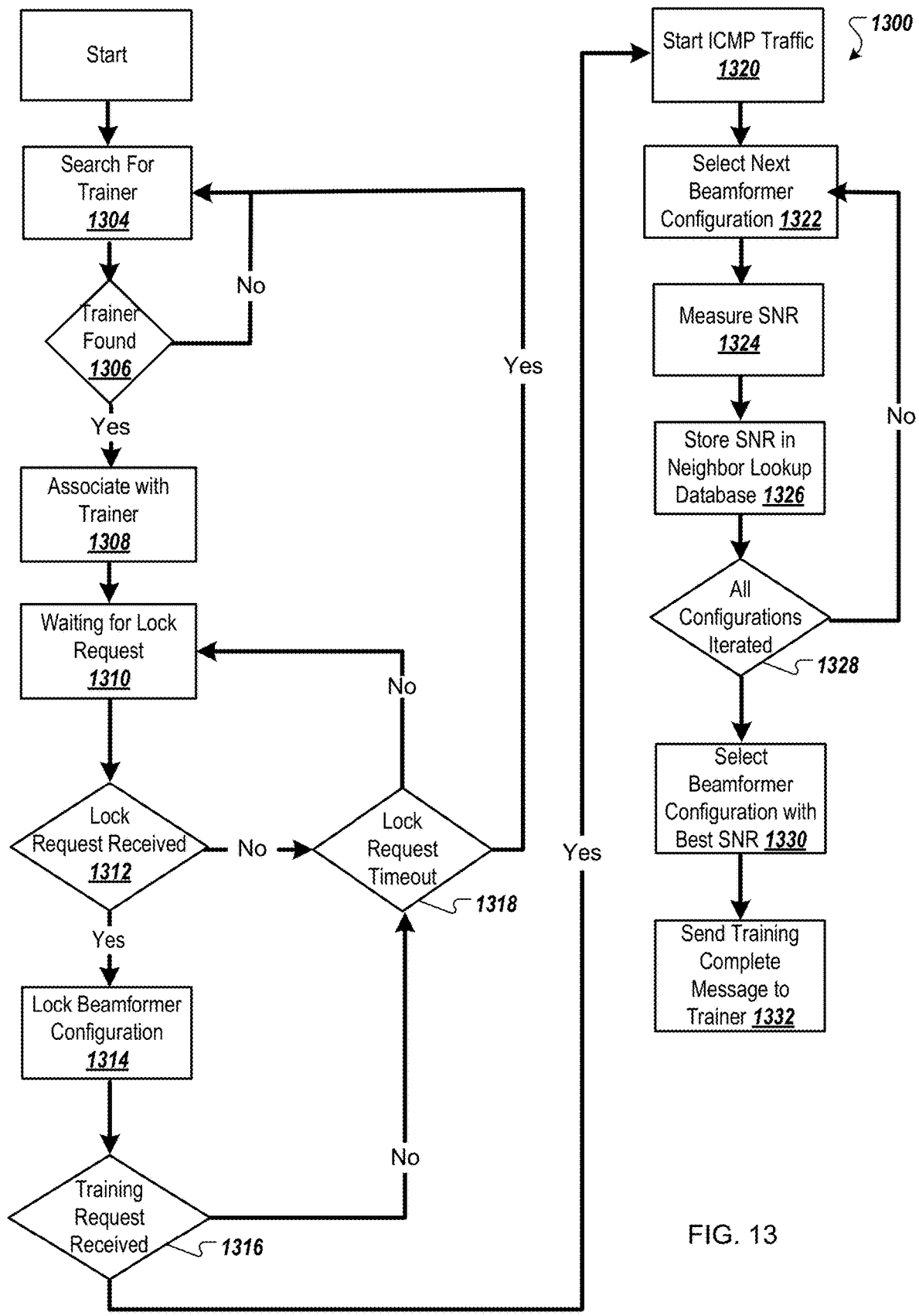
FIG. 13 illustrates a flow diagram of method of performing a sectorized analog beam search, according to one embodiment.

FIG. 13 illustrates a flow diagram of method 1300 of performing a sectorized beam search, according to one embodiment. In some embodiments, method 1300 may performed by processing logic executed by a wireless device such as a trainee device. Referring to FIG. 13, at block 1304, processing logic searches for a trainer device. Processing logic may include listening for a beacon signal from a trainer device that includes data indicating the trainee device. At block 1306, processing logic determines whether a trainer device is found. Processing logic may find a trainer device and proceed along the yes path to block 1308. Processing logic may find a trainer by identifying trainee ID data within a received beacon signal. Processing logic may not find a trainer device by not identifying a beacon signal with ID in a threshold duration (e.g., a trainer searching time out duration) and processing logic proceed along the no path to block 1304.

At block 1308 processing logic associates the trainee device with the trainer device by sending an association request to the trainer device. At block 1310, processing logic awaiting a lock request from the trainer device corresponding to the association request. At block 1312, processing logic determines whether a lock request has been received by the trainee device. Processing logic may determine that a lock request has not been received and proceed along the no path to block 1318. Processing logic may determine that a lock request has been received and proceed along the yes path to block 1314.

At block 1318, processing logic determines whether a threshold duration has passed (e.g., a lock request timeout). Processing logic may determine the lock request timeout and proceed along the yes path back to block 1304. Processing logic may determine that the lock request has not timed out and proceed along the no path back to block 1310.

At block 1314, processing logic locks a beamformer configuration of the trainee device for a threshold period of time. At block 1314, processing logic determine whether a training request has been received by the trainee device. Processing logic may determine the training request has been received by the trainee device and proceed along the yes path to block 1320. Processing logic may determine that the training request has not been received and proceed along the no path to block 1318.

At block 1320, processing logic starts ICMP traffic. ICMP traffic may include one or more communication associations with training procedure 1100 of FIG. 11. Processing logic may initiate ICMP traffic that includes cycling through blocks 1322, 1324, 1326, and 1328 over a set of beamforming configurations associated with a sector. A sector may be associated with a wide-beam configuration pattern than spans over an associated geographic region. The one or more beamforming configurations used in the processing loop with blocks 1322, 1324, 1326, and 1328 may include one or more narrow-beam (e.g., pencil-beam) radiation patterns that propagate at one or more angles disposed within the associated geographic region corresponding to each sector.

Processing logic proceeds with selecting the next beamformer configuration (e.g., a narrow-beam radiation pattern propagating at an angle of a geographic region associated with the identified sector from block 1218 of FIG. 12). Processing logic measures an SNR value (or alternatively or additionally an RSSI value) associated with a communication between a trainer device using the beamformer configuration and the identified neighboring device. Processing logic stores the SNR value in a neighbor lookup data at block 1326 of the trainee device. At block 1328, processing logic determine whether all beamforming configurations associated with a sector have been iterated through. Processing may determine that all beamforming configuration associated with the sector have not been iterated and proceed along the no path to block 1322. Processing logic may determine that all beamforming configurations associated with the sector have been iterated and proceed along the yes path to block 1330.

At block 1330, processing identifies a beamformer configuration of the trainee device with the best signal quality metric value (e.g., a RSSI value and/or a SNR value). At block 1332, processing logic sends a training complete message to the trainer device. The training complete message may include the identified beamformer configuration with the best signal quality metric value.

Figure 14:
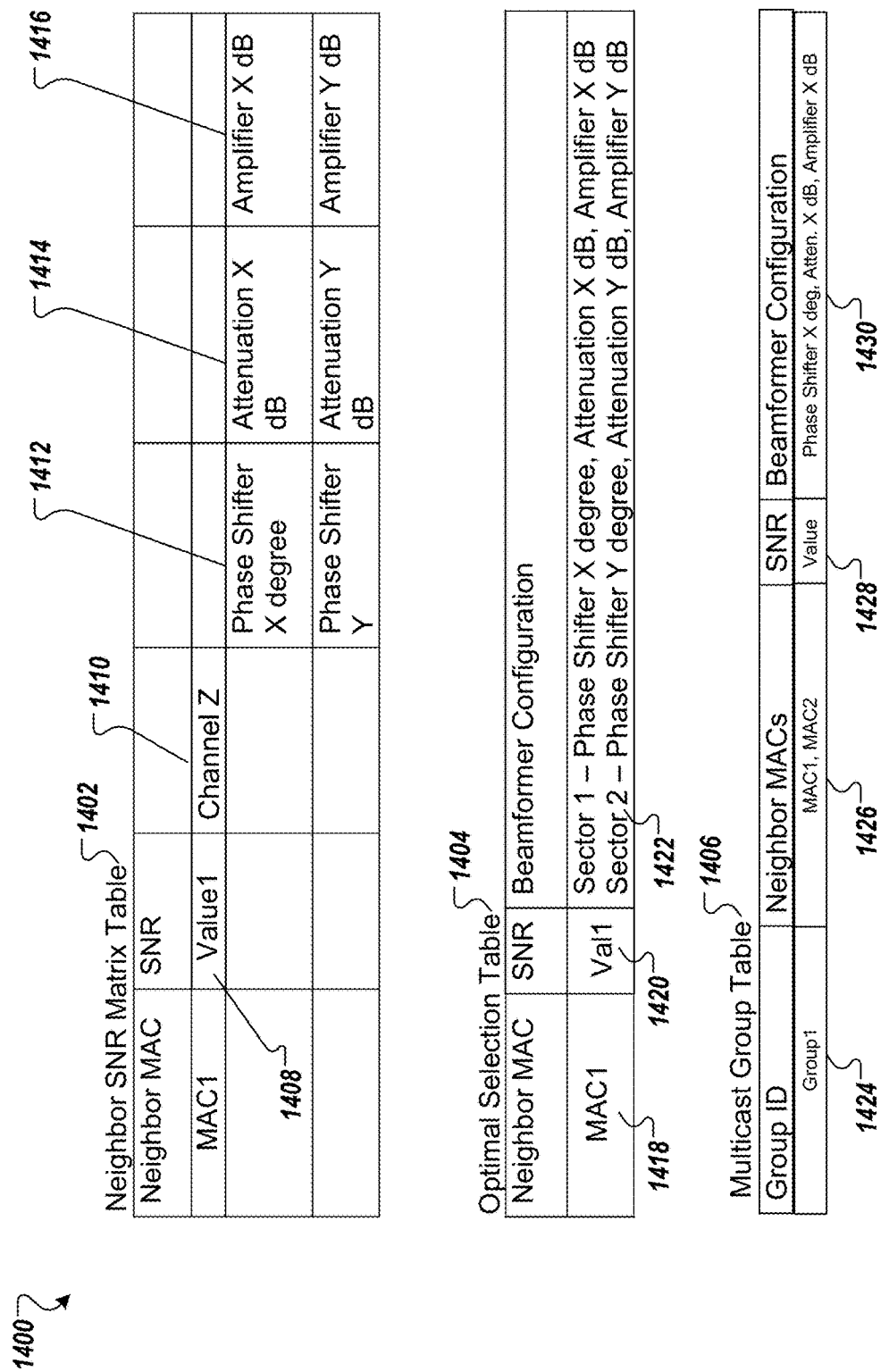
FIG. 14 illustrates an example neighbor lookup database with a neighbor signal-to-noise (SNR) matrix table, an optimal selection table, and a multicast group table according to one embodiment.

FIG. 14 illustrates an example neighbor lookup database 1400 with a neighbor signal-to-noise (SNR) matrix table 1402, an optimal selection table 1404, and a multicast group table 1406, according to one embodiment. The neighbor SNR matrix table 1402 can include an entry for each neighbor MAC. The entry includes an SNR value 1408 for the neighbor MAC. The entry also includes for each channel identifier (e.g., Channel Z) 1410 and a set of configuration settings for each sector, such as sectors 1 and 2 illustrated in FIG. 14. The first set of configuration settings includes a phase shifter angle value 1412 (e.g., X degree), an attenuation classifier 1414 (e.g., X dB), and an amplifier classifier 1416 (e.g., X dB). The sectors 1 and 2 can correspond to separate antenna arrays. Alternatively, the sectors 1 and 2 can correspond to different broad-angle radiation patterns (e.g., a superset of narrow-beam radiation patterns) of the wireless device. As noted in the example, the sectors 1 and 2 can include different configuration settings for the phase shifter angle value, attenuation value, and amplifier classifier.

The data in the neighbor SNR matrix table 1402 can be used to derive the optimal selection table 1404, which includes an optimal set of beamformer configuration for the particular neighbor MAC. The optimal selection table 1404 includes one or more entries and each entry includes a MAC identifier 1418, a SNR value 1420, and beamformer configuration data 1422 associated with the particular MAC.

The data in the neighbor SNR matrix table 1402 can be used to derive the multicast group table 1406 when sending packets via multicast. The multicast group table 1406 can include optimal beamformer configuration data 1430 for a group of MACs. The multicast group table 1406 can include an entry with a group identifier 1424, MAC identifiers 1426 within the group, a SNR value 1428, and the optimal beamformer configuration data 1430 associated with the group of MACs.

The data in the neighbor SNR matrix table 1402 can be collected with the help of a cloud coordinator, such as described below with respect to FIGS. 7-11. In particular, the purpose of the cloud coordinator is to propagate the neighbor information and populate the neighbor SNR matrix table 1402. The cloud coordinator can use a combination of scan list from each of the nodes, GPS location of the nodes, and predefined node placements to identify neighbors for each node. The cloud coordinate creates the neighbor SNR matrix table 1402. Once the neighbor SNR matrix table is created, the Cloud Coordinator sends the Training Start Period in UTC time, the Training Period, and Configurations to be trained to each pair of nodes in the network to perform sectorized analog beam searching processes and/or methods outlined in FIGS. 7-13 to populate the neighbor SNR matrix table and can derive the optimal selection table 1404 or allow each node to derive the optimal selection table 1404.

The neighbor information is then passed down to each node to create the neighbor SNR matrix table 1402, the optimal selection table 1404, and/or the multicast group table 1406. That is, each node can store its own version (or a portion) of the neighbor lookup database 1400, such as described above with the TX radio and the RX radio checking the database for the destination MAC and the source MAC, respectively, as described above with respect to FIG. 15. The cloud coordinator can send the neighbor SNR matrix table to each of the nodes and the nodes can derive the optimal section table.

Figure 15:
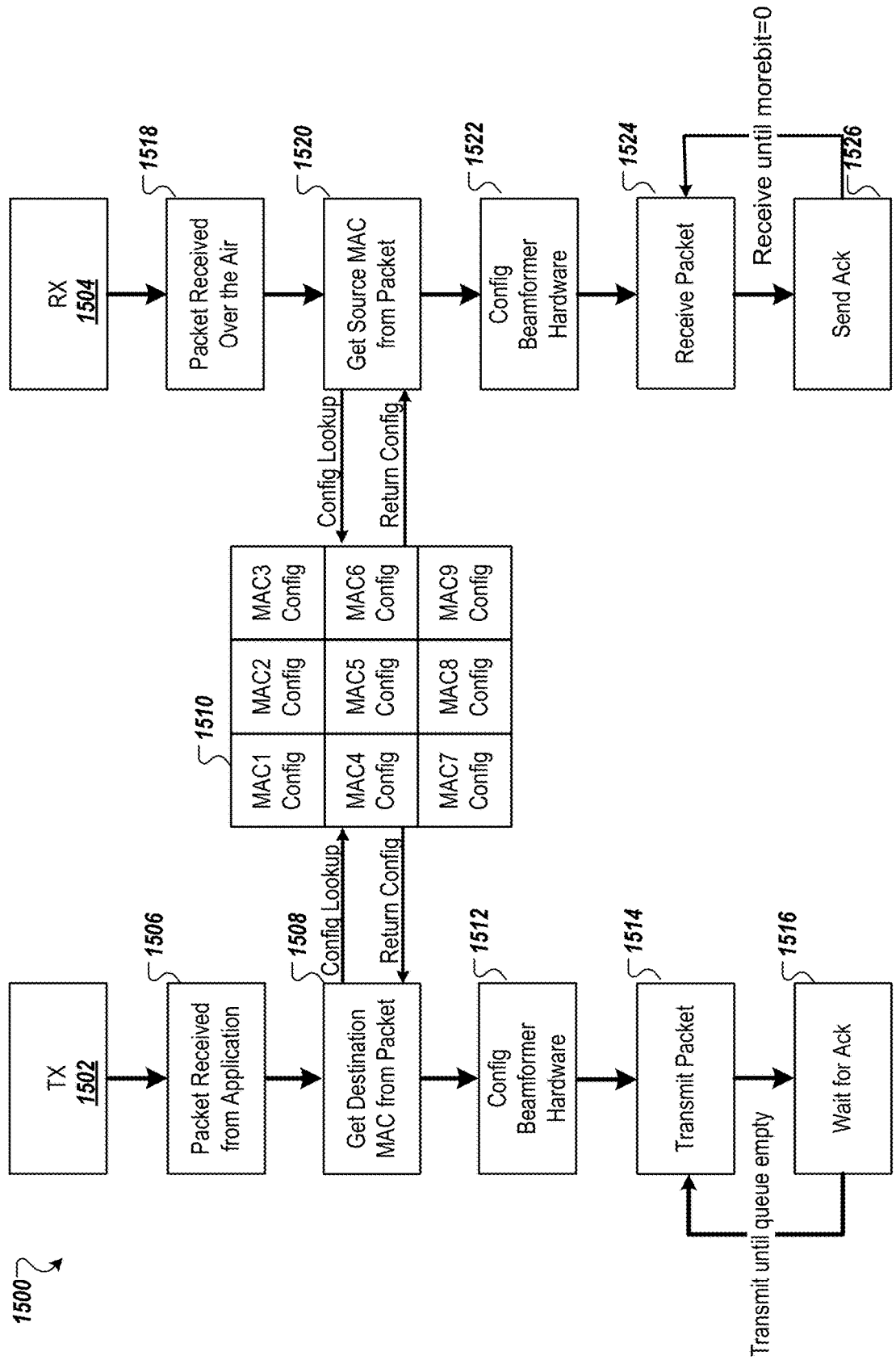
FIG. 15 is a functional diagram of a transmit (TX) radio and a receive (RX) radio for sectorized analog beam searching using a neighbor lookup database, according to one embodiment.

FIG. 15 is a functional diagram of a function flow 1500 of a transmit (TX) radio and a receive (RX) radio for sectorized analog beam searching using a neighbor lookup database according to one embodiment. Alternatively, the TX radio can be referred to as a first node or Node A and the RX radio can be referred to as a second node or Node B. During operation, the first node is put in a TX mode (block 1502) and the second node is put in a RX mode (block 1504). The TX radio receives a packet from an application to send to the RX radio at the second node (block 1506). The TX radio obtains a destination address (e.g., destination media access control (MAC) from the packet (block 1508). The TX radio performs a lookup in a neighbor lookup database 1510 to retrieve beamformer configuration data associated with the destination address. The TX radio configures the beamformer hardware, such as described above with respect to FIGS. 1B-7, according to the beamformer configuration data retrieved from the neighbor lookup database 1510 (block 1512). The neighbor lookup database 1510 can include an entry for each neighboring device that is detected by the first node. The entries can be indexed by the MAC addresses or other destination identifying information. The beamformer configuration data can include a phase shifter angle value, an attenuation value, an amplifier classifier, or any combination thereof. The beamformer configuration data can be used to control the first beamformer circuit 114 (or 116) described above with respect to FIG. 1B. After configuring the beamformer hardware at block 1512, the TX radio sends the packet (block 1514). The TX radio can wait for an acknowledgment (ACK) from the second node (block 1516). The TX radio can send until a queue is empty, returning back to block 1514.

On the second node, the RX radio is put into the RX mode (block 1504). The RX radio receives a packet over the air (block 1518). The RX radio obtains a source address (e.g., source MAC) from the packet (block 1520). The RX radio performs a lookup in a neighbor lookup database 1510 to retrieve beamformer configuration data associated with the source address. The RX radio configures the beamformer hardware, such as described above with respect to FIGS. 1B-7, according to the beamformer configuration data retrieved from the neighbor lookup database 1510 (block 1522). The RX radio processes the received packet (block 1524) and can send an ACK to the first node (block 1526). The RX radio can continue to receive data until there is no additional data in the packet being received (e.g., morebit=0 (false)).

The neighbor lookup database 1510 can be used to arbitrate the beamformer for each packet exchange session with its neighbor. Additional details and examples of the neighbor lookup database 1510 are described below.

In one embodiment, the neighbor lookup database 1510 can include three parts, a Neighbor SNR Matrix Table, an Optimal Selection Table, and a Multicast Group Table. The Neighbor SNR Matrix Table can include a beamformer phase shifter angle value, an attenuation value, an amplifier classifier, channel configuration to Signal-to-noise (SNR) matrix for each of the beamformer's neighbors, or any combination thereof. The Optimal Selection Table can include the optimal configuration for each of the beamformer's neighbors. For each neighbor, the Neighbor Lookup Database stores a received signal strength indicator (RSSI) value measured for each antenna sector, phase shifter angle value, attenuator, and amplifier classifier.

Upon receiving a packet from the application to transmit, an Optimal Selection Table is used to look up and configure the optimal beamformer configuration for the designated MAC address. Each packet is tagged with the optimal beamformer configuration for that destination. In the case where multiple packets for multiple destinations are queued by the application, each packet is tagged with the optimal beamformer configuration for that destination. The Multicast Group Table is used when transmitting multicast packets to multiple neighbors at the same time.

Upon receiving a packet over the air, the Optimal Selection Table is used to look up and configure the optimal beamformer configuration according to the source MAC address of the packet.

Figure 16:
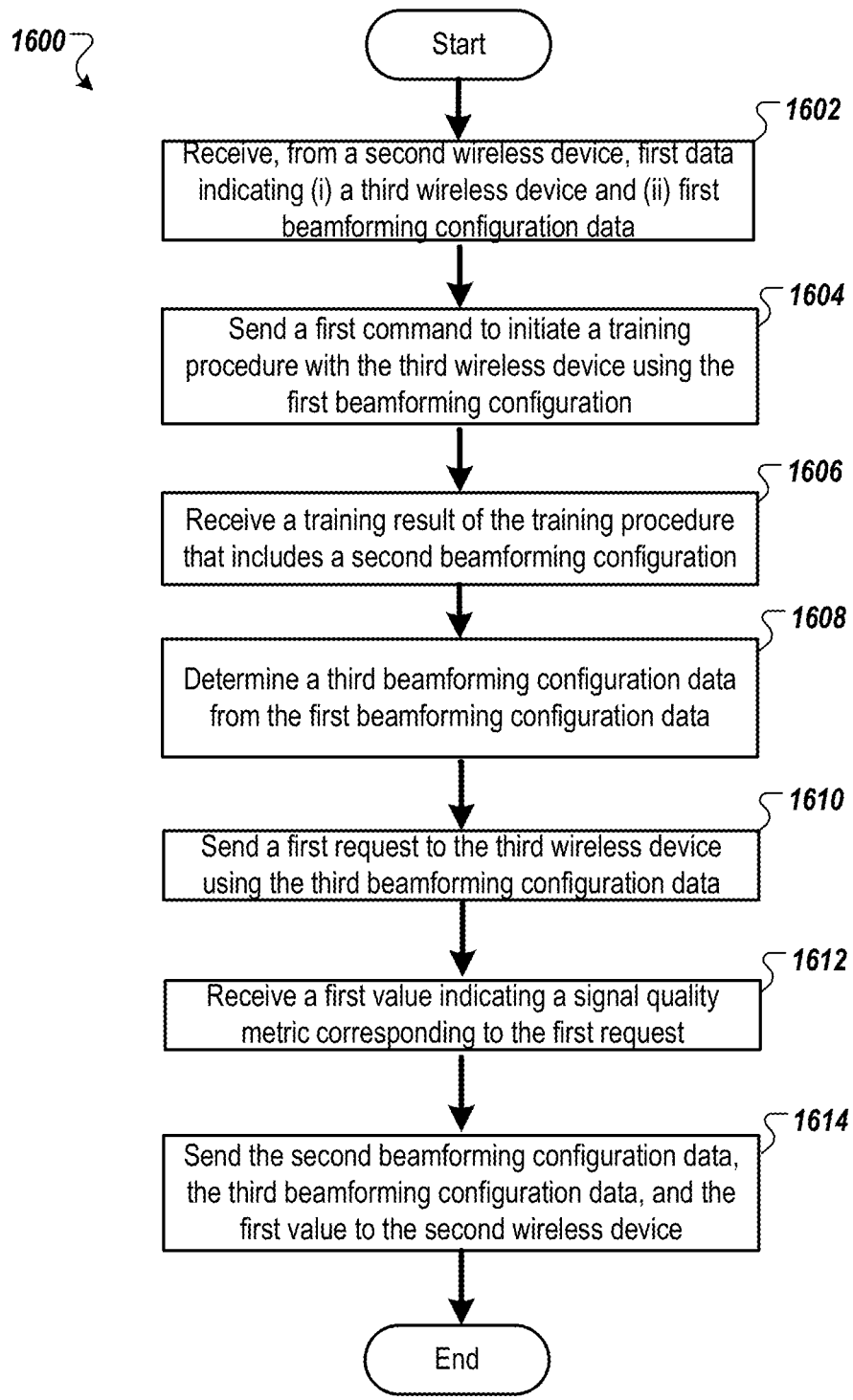
FIG. 16 is a flow diagram of a method for sectorized beam searching using a beamformer circuit, according to one embodiment.

FIG. 16 is a flow diagram of a method 1600 for sectorized beam searching using a beamformer circuit, according to one embodiment. Method 1600 may be performed between one or more wireless devices such as a cloud service provider, a trainer device, and a trainee device. Referring to FIG. 16, at block 1602, processing logic receives, from a second wireless device, first data indicating a third wireless device and first beamforming configuration data. The third wireless device may be indicated by a destination address (e.g., a network address such as a MAC address). The first beamforming configuration data may be associated with a first radiation pattern (e.g., of electromagnetic energy). The first radiation pattern may form a first beam spanning a first geographic region (e.g., associated with a beamforming configuration sector) having a first beamwidth. As described previously, a beamforming configuration sector may include a set of beamforming configurations such as beamforming configurations associated with radiation patterns that generate beams propagating at a beam angle (e.g., beam propagation angle value) within a geographic region. (e.g., the first geographic region). In some embodiments, the first beam is a wide-angle beam such as a fan-beam. In some embodiments, each of described beamforming configurations may include a phase shifter angle value (e.g., X degree), a beam attenuation value (e.g., X dB) and/or a beam amplification value (e.g., X dB).

At block 1604, processing logic sends a first command to initiate a training procedure with the third wireless device using the first beamforming configuration. The training procedure may include a beam sweep procedure performed by the third wireless device. For example, the training procedure may include one or more communication of training procedure 1000 of FIG. 10.

At block 1606, processing logic receives a training result of the training procedure that includes a second beamforming configuration. The second beamforming configuration data may be associated with a second radiation pattern, the second radiation pattern may form a second beam having a second beamwidth smaller than the first beamwidth. In some embodiments, the second beam includes a pencil-beam.

At block 1608, processing logic determines third beamforming configuration data from the first beamforming configuration data. The third beamforming configuration data may be associated with a third radiation patter, the third radiation pattern may forma a third beam that propagates at a first beam angle within the first geographic region. The third beam may have a third beamwidth smaller than the first beamwidth.

At block 1610, processing logic sends a first request to the third wireless device using the third beamforming configuration data. The first request may include a signal quality request. At block 1612, processing logic receives a first value indicating a signal quality metric corresponding to the first request. The first value may be one of an RSSI value and/or an SNR value associated with the third wireless device receiving the first request.

At block 1614, processing logic sends the second beamforming configuration data, the third beamforming configuration data, and the first value to the second wireless device. For example, the second beamforming configuration data, the third beamforming configuration data, and the first value may be phase searching procedure results. In some embodiments processing logic stores second beamforming configuration data, the third beamforming configuration data into a neighborhood lookup database, as described previously.

In some embodiments, the first data may indicate fourth beamforming configuration data associated with a fourth radiation pattern, the fourth radiation pattern may form a fourth beam spanning a second geographic regions, the fourth beam may have a fourth beamwidth. Processing logic may send to the third wireless device using the fourth beamforming configuration data, a second command initiating a second training procedure associated with the third wireless device. Processing logic may receive from the third wireless device, a second training result of the second training procedure. The second training result may include fifth beamforming configuration data associated with a fifth radiation pattern. The fifth radiation pattern may form a fifth beam having a fifth beamwidth. The fifth beamwidth may be smaller than the fourth beamwidth.

In some embodiments a first training result may include a second value indicating a signal quality metric corresponding to the first command. The second training result may include a third value indicating a signal quality metric corresponding to the second command. Processing logic may determine that the first value is greater than or less than the second less based on a comparison between the second value and the third value.

In some embodiments, processing logic determines from the first beamforming configuration data, fourth beamforming configuration data associated with the first wireless device. The fourth beamforming configuration data may be associated with a fourth radiation pattern, the fourth radiation pattern may form a fourth beam that propagates at a second beam angle within the first geographic region. The third beam may have a fourth beamwidth smaller than the first beamwidth. Processing logic may send a second request to the third wireless device using the fourth beamforming configuration data. Processing logic may receive a second value indicating a signal quality metric corresponding to the second request.

Figure 17:
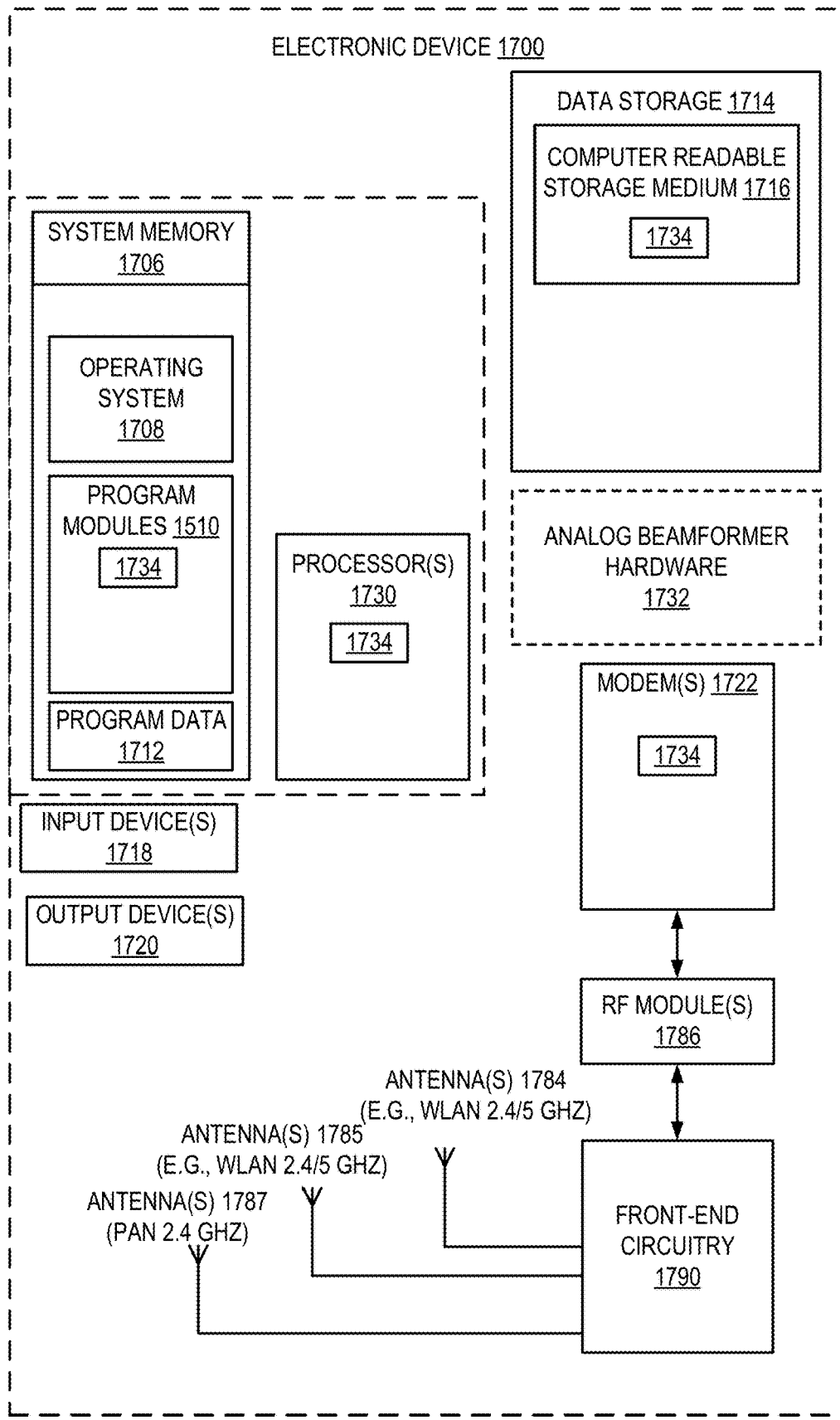
FIG. 17 is a block diagram of an electronic device that can be configured for sectorized analog beam searching as described herein, according to one embodiment.

FIG. 17 is a block diagram of an electronic device 1700 that can be configured for sectorized analog beam searching as described herein according to one embodiment. The electronic device 1700 may correspond to the electronic devices described above with respect to FIGS. 1-16. In one embodiment, the electronic device 1700 is a remote server that implements the cloud coordinator service, described herein, such as the cloud coordinator service 182 of FIG. 1A, 902 of FIG. 9, 1002 of FIG. 10, or 1102 of FIG. 11. In another embodiment, the electronic device 1700 includes the analog beamformer hardware 1732. The analog beamformer hardware 1732 can include the circuitry described above with respect to FIGS. 1B-7. In a further embodiment, the electronic device 1700 includes sectorized analog beam searching logic 1734 that performs the sectorized analog beam searching described herein, such as method 1200 of FIG. 12, method 1300 of FIG. 13, and method 1600 of FIG. 16, or any of the operations described herein. The sectorized analog beam searching logic 1734 can be implemented in the digital controller 122 of FIG. 1B or the digital controller 230 of FIG. 2. In another embodiment, the electronic device 1700 is a controller device for coordinating the sectorized analog beam searching described herein. The controller device can be a wireless device in the wireless network. The controller device can receive training reports from the various wireless device in the network and determine an optimal selection table for dynamically adjusting the beamformer configuration data on a per-packet basis. Alternatively, the electronic device 1700 may be other electronic devices, as described herein.

The electronic device 1700 includes one or more processor(s) 1730, such as one or more CPUs, microcontrollers, field programmable gate arrays, or other types of processors.

The electronic device 1700 also includes system memory 1706, which may correspond to any combination of volatile and/or non-volatile storage mechanisms. The system memory 1706 stores information that provides operating system component 1708, various program modules 1710, program data 1712, and/or other components. In one embodiment, the system memory 1706 stores instructions of methods to control operation of the electronic device 1700. The electronic device 1700 performs functions by using the processor(s) 1730 to execute instructions provided by the system memory 1706. In one embodiment, the program modules 1710 may include sectorized analog beam searching logic 1734 that may perform some or all of the operations described herein, such as the method 1600 or any combination thereof. The sectorized analog beam searching logic 1734 may perform some or all of the operations described herein for coordinated analog beam searching.

The electronic device 1700 also includes a data storage device 1714 that may be composed of one or more types of removable storage and/or one or more types of non-removable storage. The data storage device 1714 includes a computer-readable storage medium 1716 on which is stored one or more sets of instructions embodying any of the methodologies or functions described herein. Instructions for the program modules 1710 (e.g., sectorized analog beam searching logic 1734) may reside, completely or at least partially, within the computer-readable storage medium 1716, system memory 1706 and/or within the processor(s) 1730 during execution thereof by the electronic device 1700, the system memory 1706 and the processor(s) 1530 also constituting computer-readable media. The electronic device 1700 may also include one or more input devices 1718 (keyboard, mouse device, specialized selection keys, etc.) and one or more output devices 1720 (displays, printers, audio output mechanisms, etc.).

The electronic device 1700 further includes a modem 1722 to allow the electronic device 1700 to communicate via a wireless connections (e.g., such as provided by the wireless communication system) with other computing devices, such as remote computers, an item providing system, and so forth. The modem 1722 can be connected to one or more radio frequency (RF) modules 1786. The RF modules 1786 may be a WLAN module, a WAN module, wireless personal area network (WPAN) module, Global Positioning System (GPS) module, or the like. The antenna structures (antenna(s) 1784, 1785, 1787) are coupled to the front-end circuitry 1790, which is coupled to the modem 1722. The front-end circuitry 1790 may include radio front-end circuitry, antenna switching circuitry, impedance matching circuitry, or the like. The antennas 1784 may be GPS antennas, Near-Field Communication (NFC) antennas, other WAN antennas, WLAN or PAN antennas, or the like. The modem 1722 allows the electronic device 1700 to handle both voice and non-voice communications (such as communications for text messages, multimedia messages, media downloads, web browsing, etc.) with a wireless communication system. The modem 1722 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1×RTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 1722 may generate signals and send these signals to antenna(s) 1784 of a first type (e.g., WLAN 5

GHz), antenna(s) 1785 of a second type (e.g., WLAN 2.4 GHz), and/or antenna(s) 1587 of a third type (e.g., WAN), via front-end circuitry 1790, and RF module(s) 1786 as descried herein. Antennas 1784, 1785, 1787 may be configured to transmit in different frequency bands and/or using different wireless communication protocols. The antennas 1784, 1785, 1787 may be directional, omnidirectional, or non-directional antennas. In addition to sending data, antennas 1784, 1785, 1787 may also receive data, which is sent to appropriate RF modules connected to the antennas. One of the antennas 1784, 1785, 1787 may be any combination of the antenna structures described herein.

In one embodiment, the electronic device 1700 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 1722 is shown to control transmission and reception via antenna (1784, 1785, 1787), the electronic device 1700 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   receiving, by a first wireless device from a controller device, first data indicating (i) a first destination address of a second wireless device, (ii) a first angle value corresponding to a first propagation direction, and (iii) a second angle value corresponding to a second propagation direction;
   transmitting, by the first wireless device, a first signal beam along the first propagation direction, the first signal beam spanning a first geographic region and having a first beamwidth;
   receiving, by the first wireless device from the second wireless device, a first received signal strength indicator (RSSI) value corresponding to the second wireless device receiving the first signal beam;
   transmitting, by the first wireless device, a second signal beam along the second propagation direction, the second signal beam spanning a second geographic region and having a second beamwidth;

receiving, by the first wireless device from the second wireless device, a second RSSI value corresponding to the second wireless device receiving the second signal beam;

determining, by the first wireless device, that the first RSSI value is greater than the second RSSI value;

determining, by the first wireless device using a third signal beam, a third angle value corresponding to a third propagation direction located within the first geographic region, the third signal beam having a third beamwidth that is less than the first beamwidth, wherein the third propagation direction is from the first wireless device to the second wireless device; and sending, by the first wireless device to the controller device, second data indicating the third angle value.

2. The method of claim 1, further comprising:

receiving, by the first wireless device from the second wireless device, a fourth angle value corresponding to a fourth propagation from the second wireless device to the first wireless device; and sending, by the first wireless device to the controller device, third data indicating the fourth angle value.

3. The method of claim 1, wherein at least one of the first signal beam or the second signal beam comprise third data indicating the first destination address.

4. The method of claim 1, further comprising:

receiving, by the first wireless device, a third RSSI value corresponding to the second wireless device receiving the third signal beam transmitted by the first wireless device; and sending, by the first wireless device to the controller device, third data indicating the third RSSI value.

5. The method of claim 4, wherein the first beamwidth is equal to the second beamwidth.

6. The method of claim 4, wherein the first geographic region and the second geographic region are mutually exclusive.

7. The method of claim 1, wherein the first data further indicates a second destination address of a third wireless device, the method further comprising:

receiving, by the first wireless device from the third wireless device, a third RSSI value corresponding to the first signal beam received by the third wireless device;

receiving, by the first wireless device from the third wireless device, a fourth RSSI value corresponding to the second signal beam received by the third wireless device;

determining, by the first wireless device, that the third RSSI value is greater than the fourth RSSI value;

determining, by the first wireless device using the third signal beam, a fourth angle value corresponding to a fourth propagation direction located within the first geographic region, the fourth propagation direction being from the first wireless device to the third wireless device; and sending, by the first wireless device to the controller device, third data indicating the fourth angle value.

8. The method of claim 1, further comprising:

determining, by the first wireless device using a fourth signal beam, a fourth angle value corresponding to a fourth propagation direction located within the second geographic region, the fourth signal beam having a fourth beamwidth that is less than the second beamwidth, wherein the fourth propagation direction is from the first wireless device to the second wireless device; and sending, by the first wireless device to the controller device, third data indicating the fourth angle value.

9. The method of claim 1, further comprising:

determining a first signal-to-noise ratio (SNR) value based on the first RSSI value;

determining a second SNR value based on the second RSSI value; and determining that the first SNR value is greater than the second SNR value, wherein determining the third angle value is responsive to determining that the first SNR value is greater than the second SNR value.

10. A wireless device comprising:

a memory device;

two or more antenna elements, collectively configured to radiate electromagnetic energy;

a radio coupled to the memory device; and a beamformer circuit coupled to the radio, wherein the beamformer circuit comprises two or more phase shifters each coupled to one of the two or more antenna elements, wherein the radio is to:

receive, from a controller device, first data indicating (i) a first destination address of a second wireless device, (ii) a first angle value corresponding to a first propagation direction, and (iii) a second angle value corresponding to a second propagation direction;

transmit, using the beamformer circuit, a first signal beam in the first propagation direction, the first signal beam spanning a first geographic region and having a first beamwidth;

receive, from the second wireless device, a first received signal strength indicator (RSSI) value corresponding to the second wireless device receiving the first signal beam;

transmit, using the beamformer circuit, a second signal beam in the second propagation direction, the second signal beam spanning a second geographic region and having a second beamwidth;

receive, from the second wireless device, a second RSSI value corresponding to the second wireless device receiving the second signal beam;

determine that the first RSSI value is greater than the second RSSI value;

determine, by the beamformer circuit using a third signal beam, a third angle value corresponding to a third propagation direction located within the first geographic region, the third signal beam having a third beamwidth less that the first beamwidth;

send, to the controller device, second data indicating the third angle value;

receive a first instruction to communicate with the second wireless device; and send, to the second wireless device using the third propagation direction, third data based on the first instruction.

11. The wireless device of claim 10, wherein the radio is further to:

receive a fourth angle value corresponding to a fourth propagation direction, the fourth propagation direction being from the second wireless device to the wireless device; and send, to the controller device, fourth data indicating the fourth angle value.

12. The wireless device of claim 10, wherein at least one of the first signal beam or the second signal beam comprise fourth data indicating the first destination address.

13. The wireless device of claim 10, wherein the radio is further to:

receive, from the second wireless device, a third RSSI value corresponding to the second wireless device receiving the third signal beam; and send, to the controller device, fourth data indicating the third RSSI value.

14. The wireless device of claim 10, wherein the first data further indicates a second destination address of a third wireless device, wherein the radio is further to:

receive, from the third wireless device, a third RSSI value corresponding to the first signal beam received by the third wireless device;

receive, from the third wireless device, a fourth RSSI value corresponding to the second signal beam received by the third wireless device;

determine that the third RSSI value is greater than the fourth RSSI value;

determine a fourth angle value corresponding to a fourth propagation direction located within the first geographic region send, to the controller device, fourth data indicating the fourth angle value; and send, to the third wireless device, fifth data using the fourth propagation direction.

15. The wireless device of claim 10, wherein the radio is further to:

determine, by the beamformer circuit using a fourth signal beam, a fourth angle value corresponding to a fourth propagation direction located within the second geographic region, the fourth signal beam having a fourth beamwidth less that the second beamwidth;

send, to the controller device, fourth data indicating the fourth angle value; and send, to the second wireless device, fifth data using the fourth propagation direction.

16. The wireless device of claim 10, wherein the first beamwidth is equal to the second beamwidth.

17. The wireless device of claim 10, wherein the first geographic region and the second geographic region are mutually exclusive.

18. A method comprising:

receiving, by a first wireless device from a controller device, first data indicating (i) a first destination address of a second wireless device, (ii) a second destination address of a third wireless device and (iii) information corresponding to a first direction;

transmitting, by the first wireless device, a first signal in the first direction, the first signal spanning at least a first geographic region and comprising the first destination address and the second destination address;

receiving, by the first wireless device, a first response from the second wireless device and a second response from the third wireless device, wherein the first response and the second response correspond to the first signal;

determining, by the first wireless device and using a first signal beam, information corresponding to a second direction located within the first geographic region, wherein the second wireless device is located along the second direction;

determining, by the first wireless device and using the first signal beam, information corresponding to a third direction located within the first geographic region, wherein the third wireless device is located along the third direction; and sending, by the first wireless device to the controller device, the information corresponding to the second direction and the information corresponding to the third direction.

19. The method of claim 18, wherein the first data further indicates information corresponding to a fourth direction, the method further comprising:

transmitting, by the first wireless device, a second signal in the fourth direction, the second signal spanning at least a second geographic region and comprising the first destination address and the second destination address;

receiving, by the first wireless device from the second wireless device, a third response corresponding to second signal;

determining, by the first wireless device and using a second signal beam, information corresponding to a fifth direction located within the second geographic region, wherein the second wireless device is located along the fifth direction; and sending, by the first wireless device to the controller device, the information corresponding to the fifth direction.

20. The method of claim 19, wherein the first geographic region and the second geographic region are mutually exclusive.

* * * * *